United States Patent [19]

Sparks et al.

[11] Patent Number: 6,167,382
[45] Date of Patent: Dec. 26, 2000

[54] DESIGN AND PRODUCTION OF PRINT ADVERTISING AND COMMERCIAL DISPLAY MATERIALS OVER THE INTERNET

[75] Inventors: Don R. Sparks, Evanston; M. James Scott; Wally Tremel, both of Chicago, all of Ill.

[73] Assignee: F.A.C. Services Group, L.P., Chicago, Ill.

[21] Appl. No.: 09/088,173

[22] Filed: Jun. 1, 1998

[51] Int. Cl.$^7$ ...................................................... G06F 17/60
[52] U.S. Cl. ................................. 705/26; 705/27; 705/14; 707/517; 707/520
[58] Field of Search .................................. 705/26, 27, 10, 705/14, 1; 283/56; 707/517, 520

[56] References Cited

U.S. PATENT DOCUMENTS

| | | | |
|---|---|---|---|
| 4,539,653 | 9/1985 | Bartlett et al. | 707/520 |
| 4,677,571 | 6/1987 | Riseman et al. | 358/1.9 |
| 4,703,423 | 10/1987 | Bado et al. | 705/1 |
| 4,949,287 | 8/1990 | Yamaguchi et al. | 707/520 |
| 5,133,051 | 7/1992 | Handley | 707/514 |
| 5,142,620 | 8/1992 | Watanabe et al. | 345/508 |
| 5,170,467 | 12/1992 | Kubota et al. | 707/520 |
| 5,214,755 | 5/1993 | Mason | 707/520 |
| 5,349,648 | 9/1994 | Handley | 707/517 |
| 5,459,826 | 10/1995 | Archibald | 707/517 |
| 5,493,490 | 2/1996 | Johnson | 705/26 |
| 5,701,500 | 12/1997 | Ikeo et al. | 707/517 |
| 5,845,302 | 12/1998 | Cyman, Jr. et al. | 707/517 |
| 5,890,175 | 3/1999 | Wong et al. | 705/26 |
| 5,897,622 | 4/1999 | Blinn et al. | 705/26 |

FOREIGN PATENT DOCUMENTS

| | | | |
|---|---|---|---|
| 0 674 277 A2 | 9/1995 | European Pat. Off. | G06F 17/21 |
| 0 814 425 A2 | 12/1997 | European Pat. Off. | G06K 15/02 |
| WO 98 04988 A1 | 2/1998 | WIPO | G06F 17/60 |
| WO 98 10356 A1 | 3/1998 | WIPO | G06F 17/22 |

OTHER PUBLICATIONS

PhotoDisc Inc, PhotoDisc Web Site Wins Prestigious Electronic Commerce Award; Communications Week and Network Computing Name PhotoDisc the Best Commerce Site on the Internet, Business Wire, Dialog File 621:New Product Announcement, Sep. 24, 1996.

"HP Introduces Leading–Edge Intranet Solutions, Partners, Services and Products; Fortune 500 Companies Act Now to Create Their Extended Enterprise with HP Domain Intranet Solutions", Business Wire, Dialog File 621:New Product Announcement, Mar. 12, 1997.

"Excalibur and New Mexico Software Partner to Offer Kodak's FlashPix Images over the Internet", Business Wire, Dialog File 16:Promt, Apr. 14, 1997.

"Corbis Broadens Visual Content Offerings", Business Wire, Dialog File 16:Promt, Feb. 3, 1998.

Jorgensen, Dennis D., "Now, We Have a Brief Word for our Sponsors (Sponsors of the 1997 American Marketing Assn Edison Awards)", Marketing News, vol. 32, No. 7, p. 4, Mar. 30, 1998.

*Primary Examiner*—Emanuel Todd Voeltz
*Assistant Examiner*—John W. Hayes
*Attorney, Agent, or Firm*—Jefferson Perkins

[57] ABSTRACT

A client at a remote site may order each of a series of images from a low resolution image database, and may then assemble these images and text into a marketing piece. Once assembly is complete, the client orders the system proprietor to produce the marketing piece according to the client's specifications. The client communicates to the system proprietor via a web site on the Internet, which has associated with it a pair of applications for the ordering of images and the assembly of marketing pieces. The client assembles the marketing piece according to one of a series of predefined templates, which constrains the choices which the client has such that the produced marketing piece will have the look and feel dictated by the client's company. The templates, each of which has associated with it a series of slots for the placement of image or text, also permit easy assembly of a marketing piece by simply specifying the material which goes within the slot. A catalog of low-resolution images are sent over the Internet to the client for his or her consideration, and a corresponding set of high-resolution images are used to produce the marketing pieces.

1 Claim, 44 Drawing Sheets

FIG. 13

| | | |
|---|---|---|
| CP_UUID | | UUID of Table |
| CP_Customer_ID | | |
| CP_Address | | UUID of address table |
| CP_Preferred_Payment Method | | |
| CP_Credit_Card_ID | | UUID of Credit Card table |
| CP_Billing_Address | | UUID of address table |
| CP_Shipping_Address | | ID of Ship-To Table |
| CP_Image_Class_ID | | UUID of Class |
| CP_Personal_Password | <<ENCRYPTED>> | |
| CP_Group_Security | | UUID of Group Security |

FIG. 14

| | | |
|---|---|---|
| ST_UUID | | UUID of Table |
| ST_Address_ID | | CP_Shipping_Address |
| ST_Address_UUID | | AD_UUID |

FIG. 15

| | | |
|---|---|---|
| CR_UUID | | UUID of Table |
| CR_Account Number | | |
| CR_Card_Type | | |
| CR_Lastname | | |
| CR_Middle_Initial | | |
| CR_Firstname | | |
| CR_Expiration Date | | |
| CR_Address1 | | |
| CR_Address2 | | |
| CR_Address3 | | |
| CR_City | | |
| CR_State | | |
| CR_Zip | | |

FIG. 16

| AD_UUID | | UUID of Table |
|---|---|---|
| AD_Customer_ID | | |
| AD_Lastname | | |
| AD_Middle_Initial | | |
| AD_Firstname | | |
| AD_Title | | |
| AD_Company Name | | |
| AD_Email Address | | |
| AD_Address1 | | |
| AD_Address2 | | |
| AD_Address3 | | |
| AD_City | | |
| AD_State | | |
| AD_Zip | | |
| AD_Phone Number | | |
| AD_Fax Number | | |
| AD_Store Number | | |

FIG. 17

| GS_UUID | | UUID of Table |
|---|---|---|
| GS_Group_Security_ID | | Unique ID |
| Description | | |
| GS_Group_Password | <<Encrypted>> | |

FIG. 18

| TP_UUID | | UUID of Table |
|---|---|---|
| TP_Template_ID | | |
| Description | | |
| Start Date | | |
| Expiration Date | | |

FIG. 19

| TPS_UUID | | UUID of Table |
|---|---|---|
| TPS_Template_ID | | TP_Template_ID (repeating) |
| TPS_SLOT_ID | | |

FIG. 20

| SI_UUID | | UUID of Table |
|---|---|---|
| SI_Slot_ID | | |
| SI_Image_ID | | |
| Type of Image | I, C, Text, Template | |

FIG. 21

| CIO_UUID | | |
|---|---|---|
| CIO_Invoice_ID | | |
| CIO_Date_Created | | |
| CIO_Time_Create | | |
| CIO_Session_ID | | |

FIG. 22

| COO_UUID | | UUID of Table |
|---|---|---|
| COO_Invoice_ID | | CIO_Invoice_ID |
| COO_Customer_ID | | CP_UUID |
| COO_Session_ID | | SE_Session_ID |
| COO_Order_ID | | |
| COO_Quantity | | |
| COO_Cost | | |
| COO_Order_Date | | |
| COO_Delivery_Date | | |
| COO_Print_Date | | |
| COO_Date_Delivered | | |
| COO_Date_Order_Complete | | |
| COO_Template_ID | | |
| COO_ShipTo | | ID of COS |

FIG. 23

| COS_UUID | | UUID of Table |
|---|---|---|
| COS_Invoice_ID | | |
| COS_Customer_ID | | |
| COS_Session_ID | | |
| COS_Order_ID | | |
| COS_Address_ID | | UUID of Address Table |

FIG. 24

| COT_UUID | | UUID of Table |
|---|---|---|
| COT_Template_ID | | |
| COT_Slot_ID | | |
| COT_Image_ID | | |
| COT_Image_Type | | |
| COT_Coupon_Text1 | | |
| COT_Coupon_Text2 | | |
| COT_Coupon_Text3 | | |
| COT_Coupon_Text4 | | |
| COT_Coupon_Text5 | | |
| COT_Coupon_Text6 | | |
| COT_Coupon_Text7 | | |
| COT_Coupon_Text8 | | |
| COT_Coupon_Text9 | | |
| COT_Coupon_Text10 | | |

FIG. 25

| Session ID | | UUID of Table |
|---|---|---|
| Customer ID | | correspond to customer profile table |
| Quantity | | |
| Cost | | |
| Order Date | | |
| Delivery Date | | |
| Print Date | | |
| Customized Text | | |
| Template Name | | |
| Image Name | | |
| Image File Path | | |
| Image Box Name | | |
| Text Name | | |
| Text File Path | | |
| Text Box Name | | |

FIG. 26

| IC_UUID | | UUID of Image Class |
|---|---|---|
| IC_ID | | UNIQUE ID for Image Class |
| IC_Description | | |

FIG. 27

| ICT_UUID | | UUID of Image-Class-template |
|---|---|---|
| ICT_IC_ID | | ID for Image Class |
| ICT_Template | | ID for Template Profile |

FIG. 28

| SE_UUID | | UUID of table |
|---|---|---|
| SE_Session_ID | | |
| SE_Date | | |
| SE_Time | | |
| SE_Customer_ID | | |

FIG. 29

| LH_UUID | | |
|---|---|---|
| LH_Session_ID | | |
| LH_Customer_ID | | |
| LH_Date | | |
| LH_Time | | |

FIG. 32 search results new search

Narrow down my search for
[burgers]

by also looking for
[        ]  search

---

Image # 020006
description:
Big Mac® Sandwich
[add to cart] [see details]

---

Image # 080504
description:
Double Quarter Pounder® with Cheese Sandwich
[add to cart] [see details]

---

Image # 020105
description:
Quarter Pounder® with Cheese Sandwich
[add to cart] [see details]

---

Image # 020127
description:
Quarter Pounder® with Cheese Extra Value Meal®, with new Coca-Cola® cup
[add to cart] [see details]

---

Image # 020128
description:
Quarter Pounder® with Cheese Sandwich, 97 White Format
[add to cart] [see details]

see next ▶

FIG. 36 search results

Narrow down my search for
[burgers]

by also looking for
[          ]  search new search

---

IN CART
Image # 020006 description:
Big Mac® Sandwich

---

Image # 080504
description:
Double Quarter Pounder® with Cheese Sandwich

[add to cart] [see details]

---

Image # 020105
description:
Quarter Pounder® with Cheese Sandwich

[add to cart] [see details]

---

Image # 020127
description:
Quarter Pounder® with Cheese Extra Value Meal®, with new Coca-Cola® cup

[add to cart] [see details]

---

Image # 020128
description:
Quarter Pounder® with Cheese Sandwich, 97 White Format

[add to cart] [see details]

see next

FIG. 37 checkout confirmation

This is your final confirmation. Please review the information. Choose the 'final confirmation' button to place the order, or 'back' to make changes.

Billing Information:
Your Full Name: Don Sparks
Title: Director
Your Email: don_sparks@frankel.com
Telephone: 312-552-3561
Company Name: Frankel
Your Address: 111 E. Wacker
Your City: Chicago
Your State: IL
Your Zip: 60601

Image Charges:
Big Mac® Sandwich
1 disk image Shipped to: NY Office - NY NY
This disk image will be used in the USA on Television
The color profile of this image is RGB
The image format is EPS (Mac)
The type of disk is SyQuest 200MB
Image # 020006
Image size is 13.25" x 12.72" @300ppi
    The price of 1 unit of this image at $150.00 per unit is $150.00
        This price does not include carrier charges
            Appropriate sales tax will be added Quarter Pounder® with Cheese
1 disk image Shipped to: NY Office - NY NY
This disk image will be used in the USA on Television
The color profile of this image is RGB
The image format is EPS (Mac)
The type of disk is SyQuest 200MB
Image # 020105
Image size is 18.74" x 15.41" @300ppi
    The price of 1 unit of this image at $150.00 per unit is $150.00
        This price does not include carrier charges
            Appropriate sales tax will be added

Carrier Charges:
disk order shipped to: NY Office - NY NY
2 images on 1 SyQuest 200MB
carrier charge for 1 is $ 125

Total Carrier Charge: $ 125
Total Image Charge: $ 300

Grand Total: $ 425

[back] [final confirmation]

FIG. 38 order complete

Your order has been completed. Items ordered through the mail will be shipped promptly. Print a copy of this page for your records.

Billing Information:
Your Full Name: Don Sparks
Title: Director
Your Email: don_sparks@frankel.com
Telephone: 312-552-3561
Company Name: Frankel
Your Address: 111 E. Wacker
Your City: Chicago
Your State: IL
Your Zip: 60601

Image Charges:
Big Mac® Sandwich
1 disk image Shipped to: NY Office – NY NY
This disk image will be used in the USA on Television
The color profile of this image is RGB
The image format is EPS (Mac)
The type of disk is SyQuest 200MB
Image # 020006
Image size is 13.25" x 12.72" @300ppi The price of 1 unit of this image at $150.00 per unit is $150.00
This price does not include carrier charges
Appropriate sales tax will be added Quarter Pounder® with Cheese
1 disk image Shipped to: NY Office – NY NY
This disk image will be used in the USA on Television
The color profile of this image is RGB
The image format is EPS (Mac)
The type of disk is SyQuest 200MB
Image # 020105
Image size is 18.74" x 15.41" @300ppi The price of 1 unit of this image at $150.00 per unit is $150.00
This price does not include carrier charges
Appropriate sales tax will be added

Carrier Charges:
disk order shipped to: NY Office – NY NY
2 images on 1 SyQuest 200MB
carrier charge for 1 is $ 125

Total Carrier Charge: $ 125
Total Image Charge: $ 300

Grand Total: $ 425

[ back to home ]

FIG. 39

```
┌─────────────────────────────────────────────────────────┐
│         P.O.P.  Merchandising Kits                      │
├──────────┬──────────┬──────────┬────────────────────────┤
│   Home   │  Select  │   Help   │     Tutorial           │
├──────────┴──────────┴──────────┴────────────────────────┤
│                                      Welcome            │
├─────────────────────────────────────────────────────────┤
│ Point.Click.Merchandise                                 │
│    Welcome Don Sparks                                   │
│       Here's your chance to put together P.O.P. faster than ever before. │
│       · Create a complete merchandising program in just ten clicks │
│       · Choose from ten corporate-approved templates to begin │
│       · Customize with the price point that drives traffic │
│                         ┌─────────┐                     │
│                         │ Next ▷  │                     │
│                         └─────────┘                     │
└─────────────────────────────────────────────────────────┘
```

FIG. 40

```
┌─────────────────────────────────────────────────────────┐
│         P.O.P.  Merchandising Kits                      │
├──────────┬──────────┬──────────┬────────────────────────┤
│   Home   │  Select  │   Help   │     Tutorial           │
├──────────┴──────────┴──────────┴────────────────────────┤
│                                      Select             │
├─────────────────────────────────────────────────────────┤
│                  What region do you represent?          │
│                  ┌──────────────────┬─┐                 │
│                  │ -select a region-│▼│                 │
│                  └──────────────────┴─┘                 │
│                              ⓘ                          │
│                              Go                         │
└─────────────────────────────────────────────────────────┘
```

FIG. 41

```
┌─────────────────────────────────────────────────────────────┐
│  P.O.P.  Merchandising Kits                                 │
│ ┌────────┐┌────────┐┌────────┐      ┌────────┐              │
│ │  Home  ││ Select ││  Help  │      │ Tutorial│             │
│ └────────┘└────────┘└────────┘      └────────┘              │
│                                  ⊞ Select                   │
│─────────────────────────────────────────────────────────────│
│                                                             │
│         Which co-op are you placing an order for?           │
│              ┌──────────────────┬─┐                         │
│              │ -select a co-op- │▼│                         │
│              └──────────────────┴─┘                         │
│                         ⊙                                   │
│                        Go                                   │
└─────────────────────────────────────────────────────────────┘
```

FIG. 42

```
┌─────────────────────────────────────────────────────────────┐
│  P.O.P.  Merchandising Kits                                 │
│ ┌────────┐┌────────┐┌────────┐      ┌────────┐              │
│ │  Home  ││ Select ││  Help  │      │ Tutorial│             │
│ └────────┘└────────┘└────────┘      └────────┘              │
│                                  ⊞ Select                   │
│─────────────────────────────────────────────────────────────│
│                                                             │
│        Which local timeframe are you ordering for?          │
│              ┌──────────────────┬─┐                         │
│              │ -select a timeframe- │▼│                     │
│              └──────────────────┴─┘                         │
│                         ⊙                                   │
│                        Go                                   │
└─────────────────────────────────────────────────────────────┘
```

FIG. 43

```
┌─────────────────────────────────────────────────────────────┐
│  P.O.P.  Merchandising Kits                                 │
│ ┌────────┐┌────────┐┌────────┐      ┌────────┐              │
│ │  Home  ││ Select ││  Help  │      │ Tutorial│             │
│ └────────┘└────────┘└────────┘      └────────┘              │
│                                  ⊞ Select                   │
│─────────────────────────────────────────────────────────────│
│               Pick the product you are promoting.           │
│   ① Regular Menu           or        ② Breakfast            │
│   ┌──────────────────┬─┐             ┌──────────────────┬─┐ │
│   │ -select a product- │▼│           │ -select a product- │▼│ │
│   └──────────────────┴─┘             └──────────────────┴─┘ │
│           ⊙                                    ⊙            │
│          Go                                   Go            │
└─────────────────────────────────────────────────────────────┘
```

FIG. 49

| P.O.P. Merchandising Kits | | | |
|---|---|---|---|
| Home | Select | Help | Tutorial |

Order Information

Choose Your Method of Production and Distribution

☒ Worldwide
- Frankel will deliver your approved file to Worldwide
- Worldwide will produce, pack to the store specifications based on store profiles, ship and bill
- The cost structure of this scenario is:

$ per kit

☐ Locally produced/distributed
- Frankel will ship your approved file to the production destination of your choice
- You assume liability for the final production quality and distribution
- The cost of this scenario is:

$ for creative file, proofing and shipping

[cancel] [accept]

FIG. 49a

P.O.P. Merchandising Kits

| Home | Select | Help | Tutorial |

*Billing Information*

P.O. Billing Information

Company:
[Frankel & Co.]

P.O. Contact Name:
[Don Sparks]

Your Name:
[Don Sparks]

P.O. Contact Telephone:
[312-552-5000]

P.O. Number:
[1234567890]

☒ I understand that this transaction is subject to the rules and procedures found in the disclaimer

[reset] [submit]

FIG. 50

P.O.P. Merchandising Kits

| Home | Select | Help | Tutorial |

*Order Information*

Shipping address for proof

Proof will be sent overnight via Fed Ex

Attention Name:
[Don Sparks]

Address:
[111 East Wacker Drive]

City: [Chicago]   State: [IL]   Zip: [60601]

Telephone:
[312-552-5000]

Special Shipping Instructions
[                    ]

[cancel] [accept]

FIG. 51

P.O.P. Merchandising Kits

| Home | Select | Help | Tutorial |

Order Confirmation

P.O.P. Merchandising Kits

| | |
|---|---|
| Region: | South Florida |
| Co-op: | So. Florida Miami/Ft. Lauderdale |
| TimeFrame: | November 1998 |
| Product: | Big Mac |
| Kit Elements: | |
|   Exterior: | Rooftop Banner |
| | Pump Topper |
|   Window: | Window Decal |
|   Interior: | Super Translite |
| | Translite |
| | Register Topper |
|   Drive-Thru: | Translite |
| Exterior Price: | 99¢ |
| Interior Price: | $2.99 |
| Print Qty: | 100 |
| Distribution Method: | Worldwide |
| Name: | Don Sparks |
| Title: | Managing Director |
| Address 1: | 111 East Wacker Drive |
| Address 2: | Floor 23 |
| City: | Chicago |
| State: | IL |
| Zip: | 60601 |
| Telephone: | 312-552-5000 |
| Email: | don_sparks@frankel.com |
| P.O. Billing Information | |
| Company: | Frankel & Co. |
| P.O. Contact Name: | Don Sparks |
| P.O. Contact Telephone: | 312-552-5000 |
| P.O. Number: | 1234567890 |

*This is your final confirmation. Please review the information. Choose the "final order" button to place the order or "cancel" to make changes.*

[ cancel ] [ accept ]

FIG. 52

P.O.P. Merchandising Kits

| Home | Select | Help | Tutorial |

*Order Confirmation*

P.O.P. Merchandising Kits

| | |
|---|---|
| Region: | South Florida |
| Co-op: | So. Florida Miami/Ft. Lauderdale |
| TimeFrame: | November 1998 |
| Product: | Big Mac |
| Kit Elements: | |
|   Exterior: | Rooftop Banner |
| | Pump Topper |
|   Window: | Window Decal |
|   Interior: | Super Translite |
| | Translite |
| | Register Topper |
|   Drive-Thru: | Translite |
| Exterior Price: | 99¢ |
| Interior Price: | $2.99 |
| Print Qty: | 100 |
| Distribution Method: | Worldwide |
| Name: | Don Sparks |
| Title: | Managing Director |
| Address 1: | 111 East Wacker Drive |
| Address 2: | Floor 23 |
| City: | Chicago |
| State: | IL |
| Zip: | 60601 |
| Telephone: | 312-552-5000 |
| Email: | don_sparks@frankel.com |
| P.O. Billing Information | |
| Company: | Frankel & Co. |
| P.O. Contact Name: | Don Sparks |
| P.O. Contact Telephone: | 312-552-5000 |
| P.O. Number: | 1234567890 |

This is your final confirmation. Please review the information. Choose the "final order" button to place the order or "cancel" to make changes.

[cancel] [accept]

FIG. 53

| P.O.P. Merchandising Kits | | | |
|---|---|---|---|
| Home | Select | Help | Tutorial |

*Order Confirmation*

P.O.P. Merchandising Kits

| | |
|---|---|
| Region: | South Florida |
| Co-op: | So. Florida Miami/Ft. Lauderdale |
| TimeFrame: | November 1998 |
| Product: | Big Mac |
| Kit Elements: | |
|   Exterior: | Rooftop Banner |
| | Pump Topper |
|   Window: | Window Decal |
|   Interior: | Super Translite |
| | Translite |
| | Register Topper |
|   Drive-Thru: | Translite |
| Exterior Price: | 99¢ |
| Interior Price: | $2.99 |
| Print Qty: | 100 |
| Distribution Method: | Worldwide |
| Name: | Don Sparks |
| Title: | Managing Director |
| Address 1: | 111 East Wacker Drive |
| Address 2: | Floor 23 |
| City: | Chicago |
| State: | IL |
| Zip: | 60601 |
| Telephone: | 312-552-5000 |
| Email: | don_sparks@frankel.com |
| P.O. Billing Information | |
| Company: | Frankel & Co. |
| P.O. Contact Name: | Don Sparks |
| P.O. Contact Telephone: | 312-552-5000 |
| P.O. Number: | 1234567890 |

Your order has been completed. Print this page for your records.

INVOICE: [print]

316

[back to FAC home page]

FIG. 59

DirectResponse SHELLS      F A C

| Home | Browse | Help | Tutorial |

OrderInformation

Shipping address

Special shipping instructions
[ send e-mail ]

Attention Name:
[ Don Sparks ]

Title:
[ Managing Director ]

Address Line 1:
[ 111 East Wacker Drive ]

Address Line 2:
[ Floor 23 ]

City: [ Chicago ]   State: [ IL ]   Zip: [ 60601 ]

Telephone: [ 3125525000 ]   Email Address: [ don_sparks@frank ]

Print Qty: [ 2000 ]

Proofing

[X] Priority Overnight
[ ] Standard Overnight
[ ] 2nd Day
[ ] Saver Shipping

[ reset ] [ submit ]

FIG. 60

_Direct_Response SHELLS      F.A.C.

| Home | Browse | Help | Tutorial |

Billing Information

You may select one payment method only

① Credit Card Statement Billing Address:

Attention Name:
[Don Sparks]

Type of Card
[X] Visa    [ ] Mastercard

Title:
[Managing Director]

Number:
[0000 0000 0000 0000]

Address Line 1:
[111 East Wacker Drive]

Expiration Date:
[00/98]

Address Line 2:
[Floor 23]

Full name as it appears on the card
[Don Sparks]

City: [Chicago]   State: [IL]   Zip: [60601]

Your name, if it is different from the name on the card
[ ]

Telephone: [3125525000]   Email Address: [don_sparks@frank]

[ ] I understand that this transaction is subject to the rules and procedures found in the disclaimer

[reset] [submit]

② P.O. Billing Information:

Company:
[ ]

[ ] I understand that this transaction is subject to the rules and procedures found in the disclaimer P.O. Contact Name:
[ ]

[reset] [submit]

Your Name:
[ ]

P.O. Contact Telephone:
[ ]

P.O. Number:
[ ]

FIG. 61

| DirectResponse SHELLS | | | F A C |
|---|---|---|---|
| Home | Browse | Help | Tutorial |

OrderConfirmation

Direct Response Shells
Newspaper Inserts (FSI)

| | |
|---|---|
| Highlighting: | Seasonal/Food; Oil Alliance |
| Frontside: | |
|   Headline: | Really Hungry? |
|   Image: | Quarter Pounder with Cheese Extra Value Meal |
|   Oil Alliance: | Chevron |
|   Violator: | Grab an Extra Value Meal! |
| Backside: | |
|   First Image: | Big Mac |
|   Second Image: | Map |
|   Third Image: | Charge It |
|   Headline: | When you're on the go |
|   Coupons: | Nine |
| Print Qty: | 2000 |
| Name: | Don Sparks |
| Title: | Managing Director |
| Address 1: | 111 East Wacker Drive |
| Address 2: | Floor 23 |
| City: | Chicago |
| State: | IL |
| Zip: | 60601 |
| Telephone: | 312-552-5000 |
| Email: | don_sparks@frankel.com |
| Type of Card: | Visa |
| Number: | 0000 0000 0000 0000 |
| Expiration Date: | 00/98 |

> This is your final confirmation. Please review the information. Choose the "final order" button to place the order or "cancel" to make changes.

[ cancel ] [ final order ]

FIG. 62

| Direct Response SHELLS | | | F.A.C |
|---|---|---|---|
| Home | Browse | Help | Tutorial |

OrderComplete

Your order has been completed.
Print this page for your records.

INVOICE: [ print ]

Direct Response Shells
Newspaper Inserts (FSI)
Highlighting:    Seasonal/Food; Oil Alliance
Frontside:
  Headline:    Really Hungry?
  Image:    Quarter Pounder with Cheese Extra Value Meal
  Oil Alliance:    Chevron
  Violator:    Grab an Extra Value Meal!
Backside:
  First Image:    Big Mac
  Second Image:    Map
  Third Image:    Charge It
  Headline:    When you're on the go
  Coupons:    Nine
Print Qty:    2000
Name:    Don Sparks
Title:    Managing Director
Address 1:    111 East Wacker Drive
Address 2:    Floor 23
City:    Chicago
State:    IL
Zip:    60601
Telephone:    312-552-5000
Email:    don_sparks@frankel.com
Type of Card:    Visa
Number:    0000 0000 0000 0000
Expiration Date:    00/98

[ back to FAC home page ]

DESIGN AND PRODUCTION OF PRINT ADVERTISING AND COMMERCIAL DISPLAY MATERIALS OVER THE INTERNET

TECHNICAL FIELD OF THE INVENTION

The invention pertains to the general field of print advertising and commercial display signage and their design and production, and more specifically to an integrated system using an Internet site and networked computer systems for the storage of pre-designed formats and images, the assembly of them into electronic files ready for production, and the ordering of all design, assembly, production, and distribution (and, if required, placement in a publication, including purchasing of space) from a single entry point in the system.

BACKGROUND OF THE INVENTION

Typically, the development, production, and distribution of print advertising and commercial display materials require at a minimum the following steps.

Formatting. A format is established defining materials, dimensions, number of colors, etc., that will be compatible with where the advertising or display is to appear.

Copy Development. Copy is written to fit the format.

Design. The advertising or display materials are laid out, colors chosen, and graphics planned.

Typesetting. Copy is set in type.

Graphics Development. Any required illustration or photography is prepared.

Preparation of Finished Artwork. The type and illustration or photography are assembled into artwork from which the advertising or display materials will be produced.

Delivery for Production. The artwork is delivered to a production vendor or facility, typically a printer; or, in many cases, the artwork may be distributed to more than one production vendor or facility for production in more than one locale.

Production. The production vendor or facility produces the material from the artwork.

Distribution (may include Finishing Steps). The finished material is then distributed to end users, customers, or prospects in any of several possible ways (for example, as an ad or free-standing insert in a publication such as a newspaper or magazine; to a lettershop or other processor to be packaged and mailed in a direct-mail package; to commercial enterprises to be displayed (as signage), handed out (as flyers), or used for sales presentations (as sales literature); and so forth.)

Ordering and Approvals. These are steps that, typically, must be taken at several stages in the process (for example, many commercial enterprises order most of this work done through agencies or vendors such as printers; orders for delivery or distribution may need to be placed with outside services; advertising placement must be booked with publications in which advertising matter may appear; and so forth).

Today, many steps in the development process—design, typesetting, preparation of artwork, delivery for production—may be performed electronically, using computers, where once they were done on paper.

SUMMARY OF THE INVENTION

The present invention is an integrated advertising piece design and production system that allows a user (or "client") to (a) place a comprehensive order, at a dedicated Internet site, for images and templates used for the design, assembly, production, and distribution of print advertising and/or commercial display materials; and (b) create an assembled image of the final product on the computer screen using pre-designed formats and images stored on a server in the system. Upon final approval by the client to proceed, the system can also transmit an electronic file of the product to a production vendor or facility for production and transmit all orders or notifications necessary for distribution, insertion in publications and other fulfillment tasks, etc.

Advantages to the client include greatly reduced time to develop print advertising and/or commercial display materials, since choosing from an existing menu of formats and images eliminates many time-consuming steps (creation of original art and copy and setting type, for example), and reduced cost, through elimination of the many people, steps, and agencies normally involved in developing materials of this type, which traditionally include typesetters, illustrators and/or photographers, agencies and representatives.

By minimizing or eliminating the need to create new copy and artwork every time new signage or advertising is needed, and bringing all steps in the process under the immediate control of a single computer operator, the invention can reduce the time usually required for advertising and display development from several weeks to a few days or even hours.

The present invention enables even modest business organizations to create their own high-quality advertising and display materials at a minimum in time and cost.

The key to the cost and time savings with the disclosed system is its stored, pre-created library of images and templates that can be quickly and efficiently assembled by a client or user of the system.

The client accesses the system through a World Wide Web site and places an initial order describing the advertising or display material (the "product") that the client wishes to develop and any other details relevant to the product's production, distribution, and/or insertion in a publication, such as how and by which vendor(s) the product is to be produced, how and where distributed, when and where it will appear, and any special instructions for the purchase of advertising space. Once connection is made to the system, all orders which had been placed through the system are also transmitted, either electronically or through a manual system, for distribution and billing purposes to an order-entry system that is integrated with the entire accounting system of the system provider.

From the Web site, the client's order is routed to an image manager software application (such as Open Progress Interface (OPI™), residing on an image manager server, for the management of low- and high-resolution images. The low resolution images have the advantage of being relatively small files, easily transmissible over conventional modems and telephone lines, and are used to assemble composite advertising pieces. The high-resolution images each correspond to a respective low resolution image and are used to produce the product once finally designed. From the image management server, the client selects low resolution templates and images (text and graphics) and assembles them, using an image assembler application such as Desknet™, into the image that will ultimately be produced as the finished product. Within limits set by the system, the client can also create custom text specific to the client's needs, such as prices, and store locations and site-specific information. At all times when working in the image assembler application, the client is able to preview the assembled components as they will appear in position in the finished product.

When the client has created the assembled image of the product as it is to appear, the client saves the final image as a low-resolution assembled image to a memory (the "low resolution repository"), which in one embodiment is a discrete memory space on the image manager server. From the image manager server, a medium-resolution image of the product is transmitted to a color-corrected color printer and printed out. The printed image is sent by a delivery service to the client for approval, and the client contacts the system proprietor by either electronic mail or telephone to confirm approval to execute the order in full or request changes. As an alternative to reviewing a medium-resolution printout of the assembled image, to save time the client may request that a lower-resolution representation transmitted from the image manager server directly to the client's computer by electronic mail or electronic file transfer.

Once the system proprietor has received client confirmation of the assembled image and approval to execute the order in full, the proprietor uses the client-selected image and template data in high-resolution form, which is available from a high-resolution repository on the image manager server of high-resolution images and templates, to create a high-resolution copy of the low-resolution assembled image. The high-resolution assembled image file is submitted to a color correction application such as Color Profiles™ through the image manager server to assure color correctness and consistency with other materials produced using the system. The color-corrected high-resolution assembled image file is then transmitted from the image manager server to a production vendor or facility for final production and distribution as described in the client's order.

Production and distribution will take different forms, depending on the type of product created for the client and the requirements specified in the client's order. Two types of end products are free standing inserts (FSI's) and point-of-purchase displays (POP's).

For freestanding inserts, an order to purchase space in the publications where the inserts will appear is transmitted from the order-entry system at the time that the system proprietor receives the final client approval to execute. Concomitantly, the high-resolution assembled image file is transmitted (normally via a Virtual Private Network to facilitate large-volume transmission with a high level of security) to a commercial printer for printing and distribution to publications.

For point-of-purchase displays, the high-resolution assembled image file is transmitted electronically to a commercial production facility or vendor (via a Virtual Private Network for security purposes if a vendor other than the system proprietor is used). Here it will be produced and all further arrangements executed for distribution of the product either to end users (e.g., merchants) or to their agents.

BRIEF DESCRIPTION OF THE DRAWINGS

Further aspects of the invention and their advantages will be discerned in the following Detailed Description when taken in conjunction with the drawings, in which like characters identify like parts and in which:

FIGS. 13–29 are the record formats used by the system in providing a finished advertising piece;

FIGS. 30–38 are successive screen shots of a marketing piece image ordering and design system according to an alternative embodiment of the invention, particularly focusing on image retrieval;

FIGS. 39–53 are successive computer screens presented to a client in a marketing piece design methodology according to the invention; and FIGS. 54–62 are successive screens presented to a client during the process of designing a free-standing insert according to the invention.

DETAILED DESCRIPTION OF PREFERRED EMBODIMENTS

Figure 1:
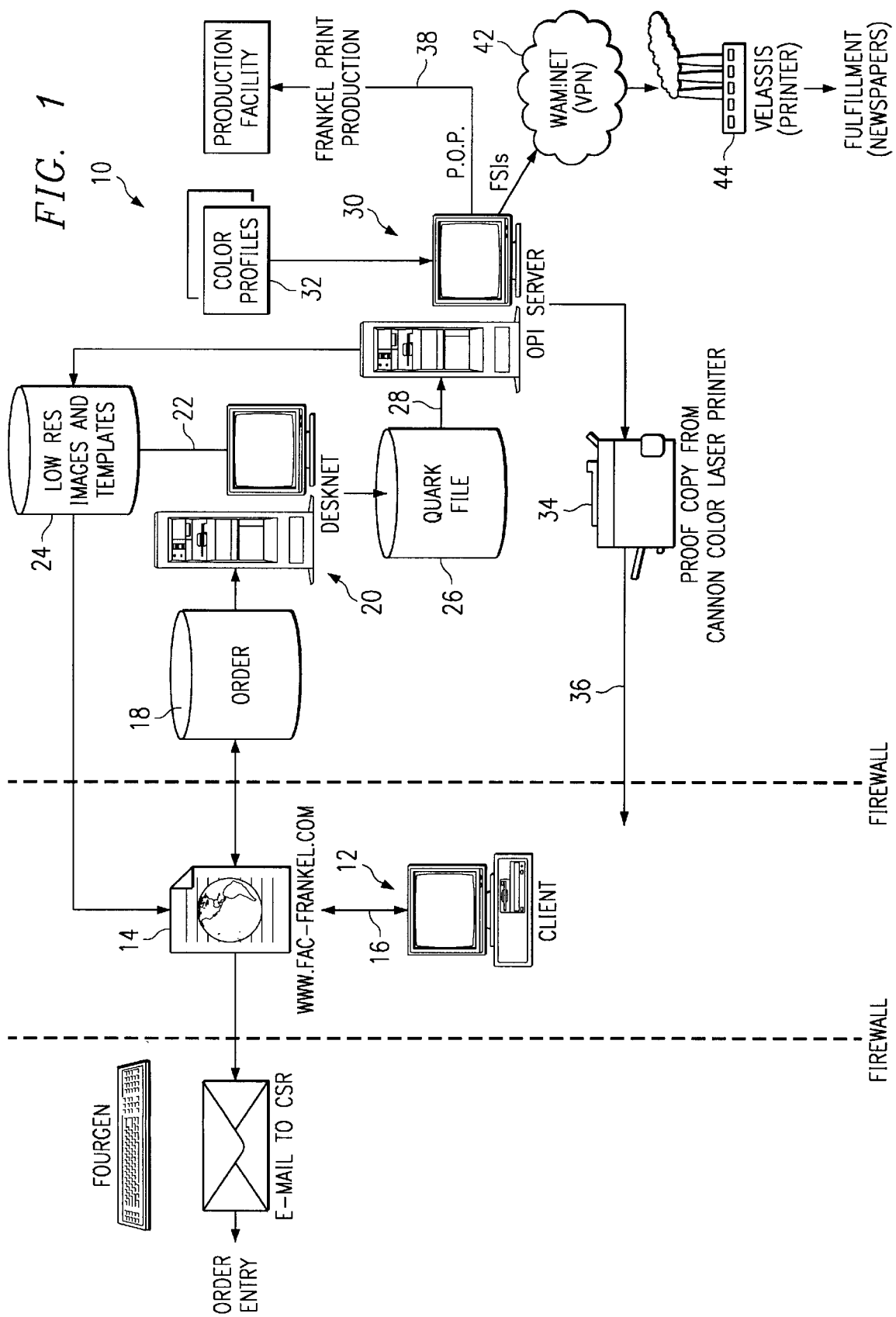
FIG. 1 is a high-level schematic diagram of an advertising piece design and ordering system according to the invention.

In FIG. 1, an automated marketing piece design and production system is indicated generally at 10. The system shows the interrelationship between a system proprietor, such as an advertising agency, and a client of that system proprietor. The client has a personal computer 12 which can be of a conventional type. The personal computer 12 has a modem connection and a browser such that the client can access a web site 14 which is mounted on a host computer. In the illustrated embodiment, the link is performed by a conventional telecommunication line 16. The web site 14 has associated with it all of the customer order logic (a processor and a stored computer program having executable instructions for the processor) necessary for a client to order a series of images for assembly into a marketing piece, and also has a design logic application which permits the client to assemble these images into such marketing piece and then to order its production by the system proprietor.

Through the web site 14, in a procedure which will be later detailed, the client places orders 18, first for images and later for an assembled marketing piece, which orders are passed to an image assembler 20. The image assembler 20 can be image assembler software, such as Desknet™, as installed on an appropriate server. The image assembler 20 has a link 22 to a memory or repository 24 that stores a series of low-resolution images and templates. Some of these low-resolution images and templates will be available to the client, depending upon the identity of the client and the organization to which the client belongs; the memory space 24 may be partitioned among several different organizations, such that the client would have access only to those images which the organization has authorized in advance.

The image assembler 20, which is linked to a high-resolution image database and image processing program such as QUARK™, produces an assembled image file 26 which is sent via a link 28 to an OPI server 30. The OPI server 30 has mounted thereon further image processing software which receives the high-resolution file on link 28. The high-resolution file is color-corrected with the use of color profiles stored at a memory 32. The high-resolution file may be sent to a color laser printer 34 to generate proofs, which are transmitted back to the client via pathway 36. While in the present embodiment insufficient bandwidth exists for the transmission of high-resolution image files back to the client computer 12, it is contemplated that such bandwidth will eventually become available, as by the use of optical fibers, television cable links or the like. In that instance, pathway 36 would become optical or electronic and would allow for the rapid transmission of the high-resolution file of the finished product back to the client computer 12 for the client's review and approval.

Once the client has approved of the finished product, the work order is fulfilled. In the instance where the system proprietor has its own production facilities, this can be by pathway 38 to a production facility 40. The production facility 40 may be localized or may be made up of a geographically dispersed network of printers which simultaneously publish the piece at each of their locations.

Alternatively, a virtual private network 42, such as Wam!Net™, may be used to submit the file to an outside vendor 44 for fulfillment of the marketing piece in this fashion.

Figure 2:
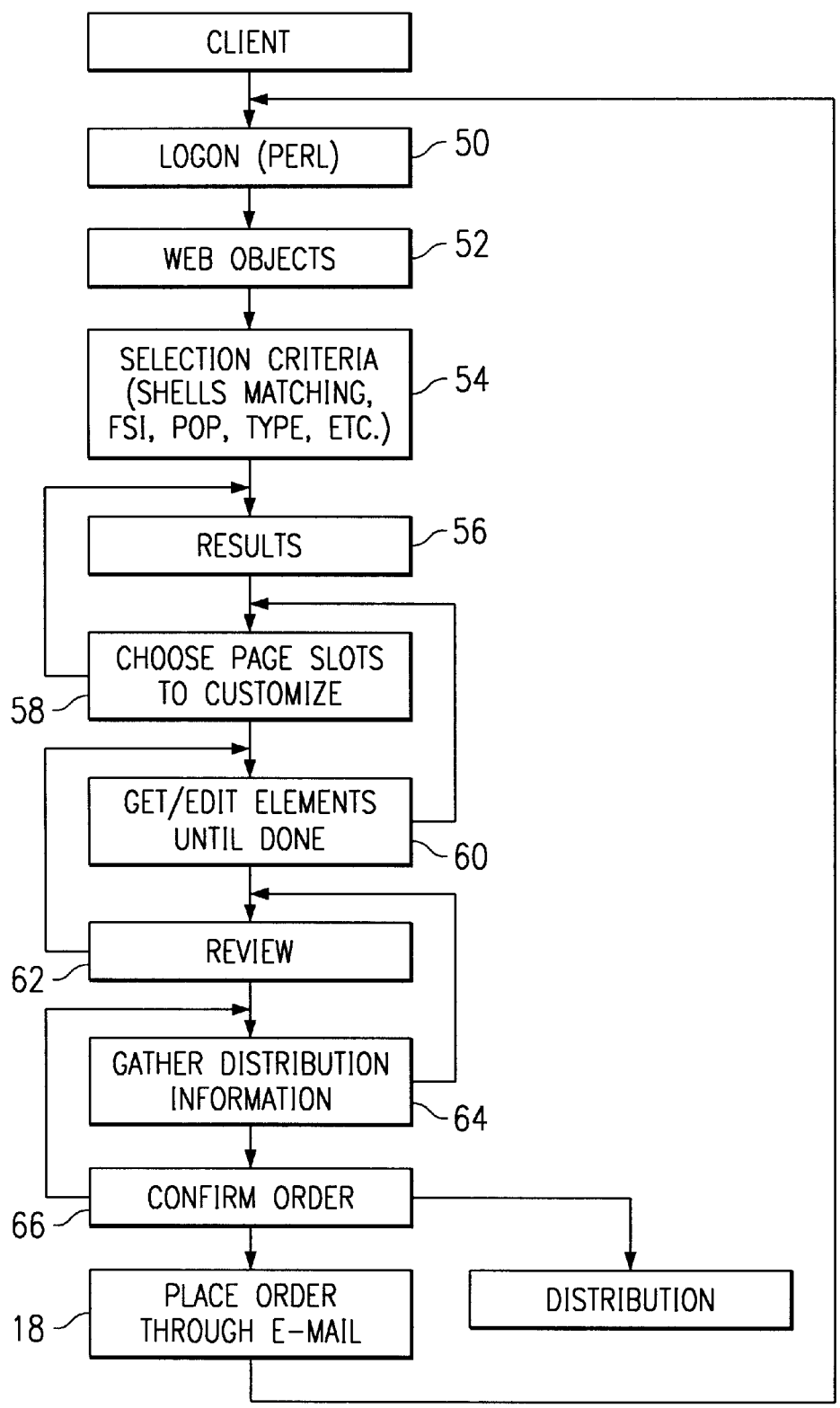
FIG. 2 is a flow chart showing a procedure for ordering images a using the system of the invention.

FIG. 2 is an overview of the procedure used by client in designing and ordering an advertising or marketing piece. The client first logs onto the system at step 50 and is presented with various web objects at 52. At step 54, the client selects the search criteria for retrieving low-resolution images, executes the search, reviews the low-resolution images and their high-resolution hardcopies, and selects from a number of different marketing piece shells. The client reviews the shell results at step 56. Once the individual shell(s) has been ascertained, at step 58 the client selects the particular slots in the shell which the client would like to customize. Image and text elements are retrieved and inserted into the shell slots at step 60 until a low-resolution assembled image of the product is reviewed at step 62. Once the assembled marketing piece is approved, the client determines distribution information at step 64. The order is confirmed by the client at step 66. An order 18 is placed through email to the system proprietor and, responsive to receiving the order, is produced and fulfilled by the system proprietor or its agent.

The sequence by which a client orders images is more particularly described by FIGS. 3–10, which are successive screens used by the client in searching for and selecting different images that are a part of the low-resolution image database.

Figure 3:
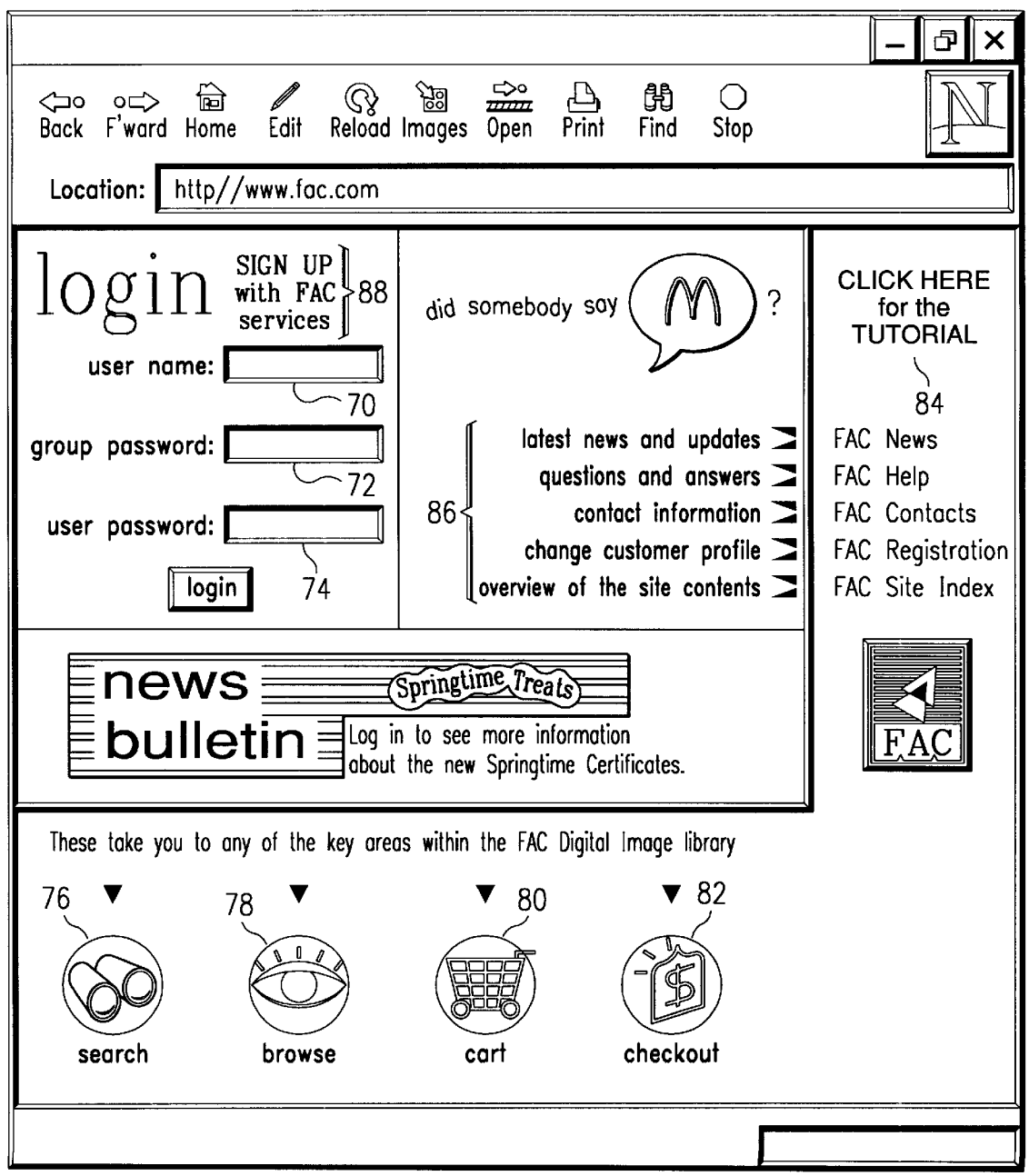
FIGS. 3–10 are views of sequential image order screens used by a client in selecting and ordering images later to be assembled into advertising pieces.
Figure 4:
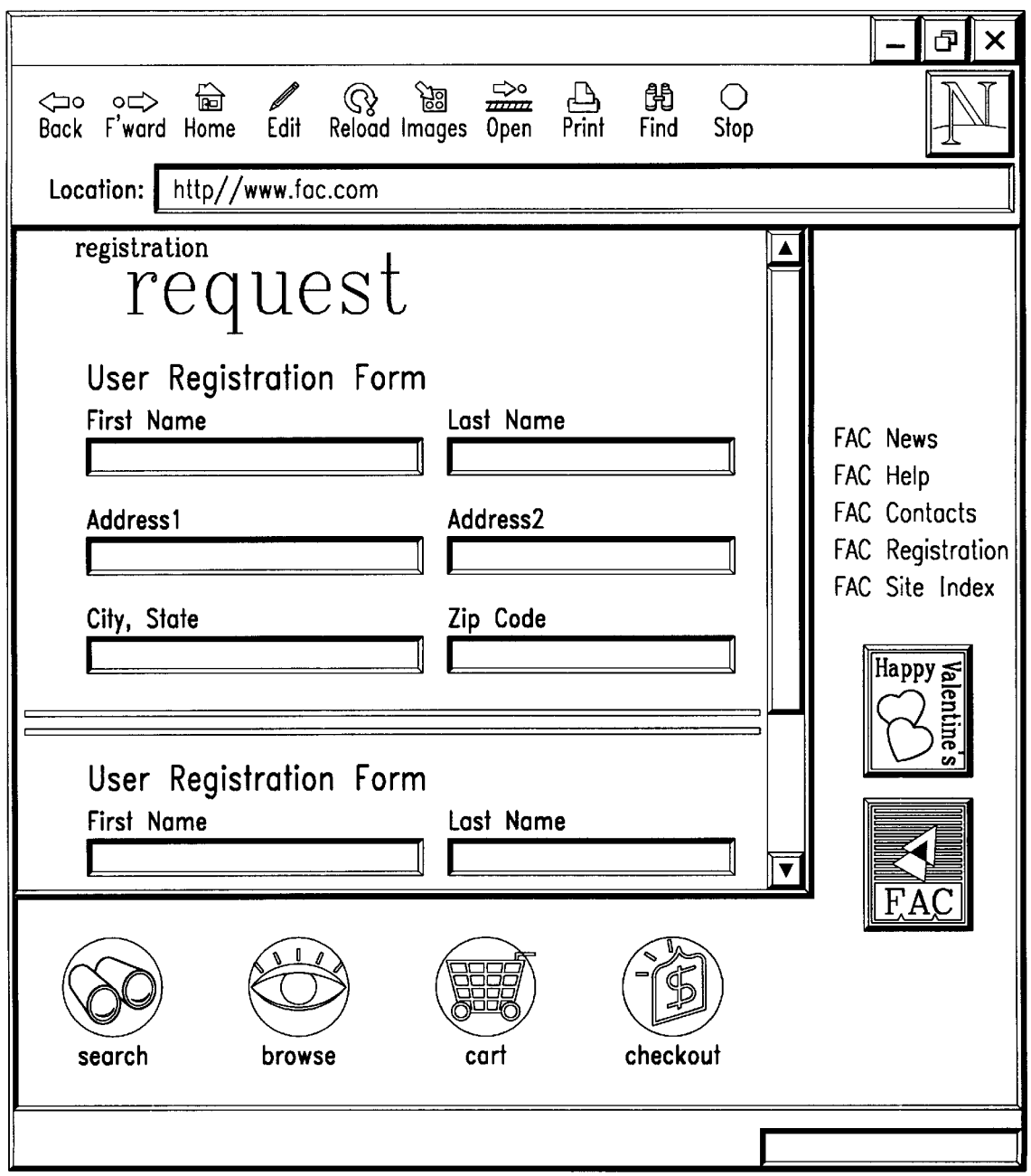

FIG. 3 in particular shows an introductory screen 69 in which the client signs on by giving his or her username 70, group password at 72 and user password 74. The client has several options he or she can take: searching for shells, templates and images, by clicking on button 76 with a mouse; browsing through retrieved shells, templates and images, by clicking on button 78; placing retrieved images in a "shopping cart" for purchase, by clicking on button 80; completing the image retrieval transaction by clicking on checkout button 82; or going into a tutorial by activating button 84. The introductory screen 69 also includes links to pages on news, help, contacts, registration, and the web site index at 86. The "sign up" icon 88 is also a link, and brings up a new user request page 90 (FIG. 4) by which certain client data are entered, including shipping information of requested images.

Figure 5:
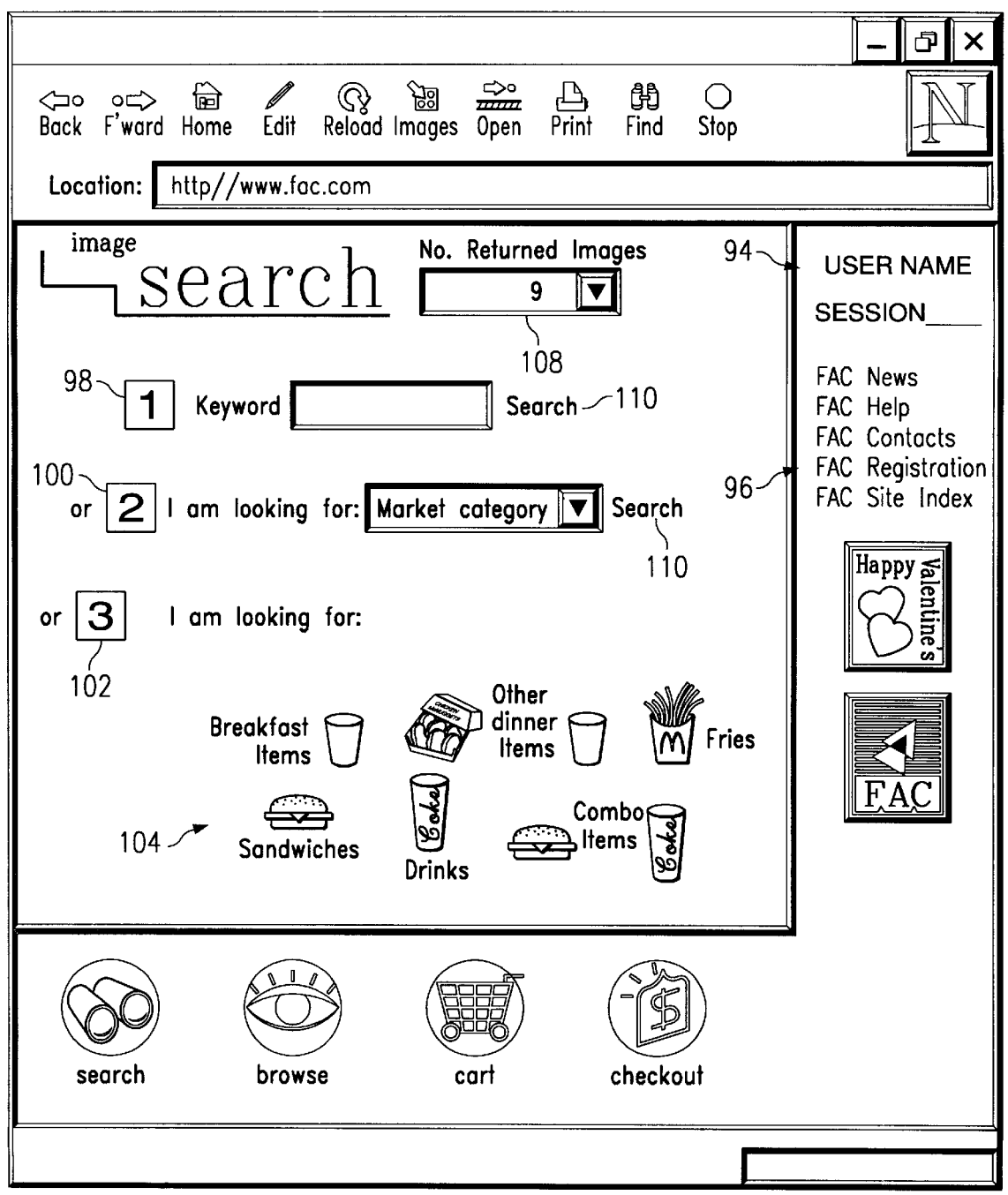

FIG. 5 is an illustration of a search request page 92. At 94, the user name and session number are displayed, so that the client has a reference to this particular session. The session number permits the client to determine the status of an order after a session, and also permits the system proprietor to keep track of the delivery of the order. At 96 are links to other areas of the site.

The search page 92 shows three ways to search for images: by keyword at 98, by category at 100, or by icon at 102. Using the keyword method, the client can type in the words which describe the image(s) sought to be retrieved, such as "chicken". It is also possible to type in an image ID number in this field, which is uniquely assigned to a particular image stored in the image database of the system. In the category method 100, one of a plurality of image categories, e.g., images which depict chicken are chosen from a drop down menu. Finally, using the icon method 102, the client can point to and click on any of series of image icons 104 which are miniature and representative views of the type of image placed in each category.

Figure 6:
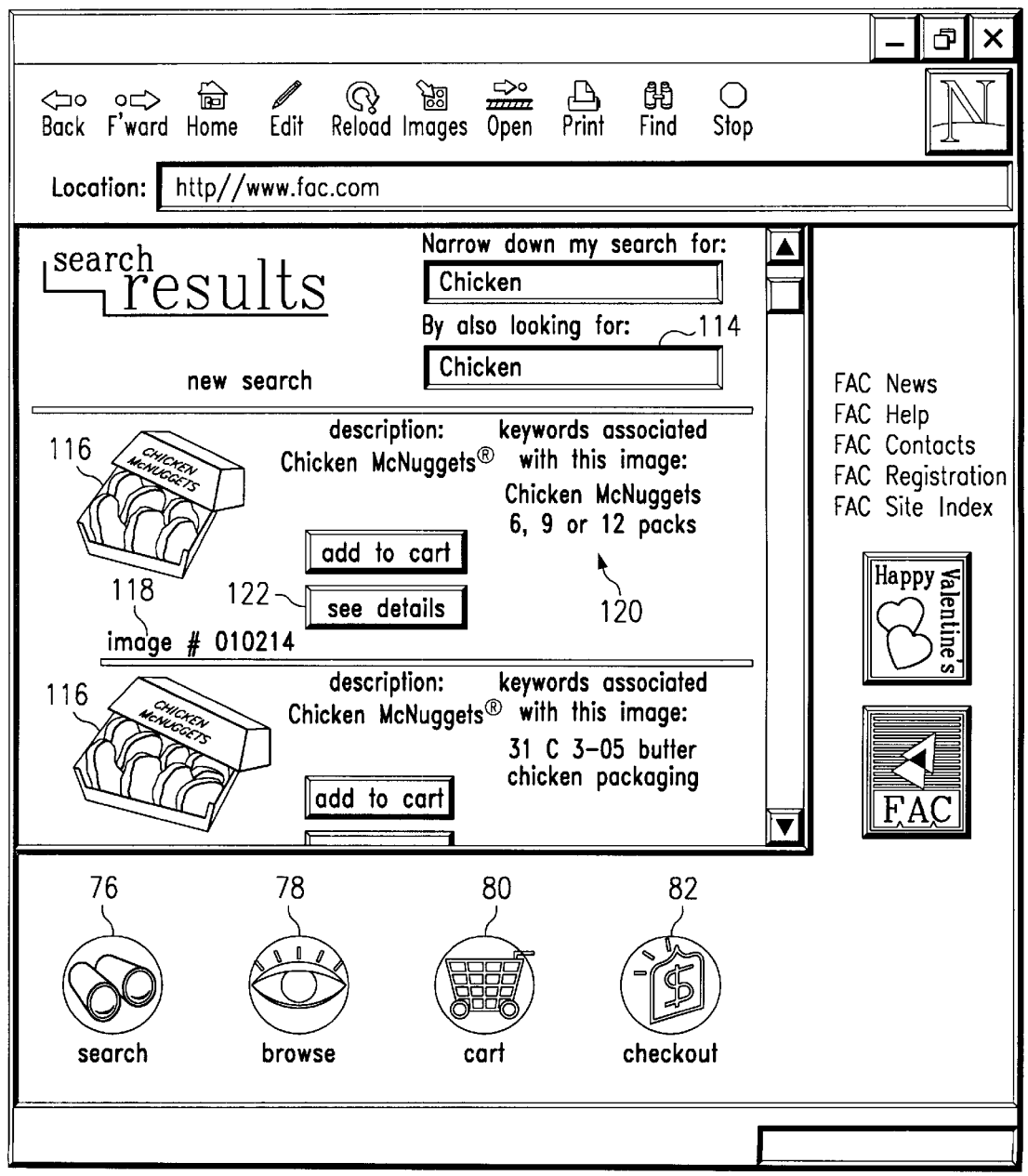

At location 108 of the search screen 92 is a menu which permits the client to determine how many images should be retrieved in response to the query. Selecting fewer images might be an advantage because then there are less retrieved image descriptions to review. Selecting more images may be faster if the image desired has particular and uncommon characteristics. After determining amount of returned potential images, the client clicks on "search" at either location 110. The system then goes to a results page 112, which is shown in FIG. 6.

It is possible that the search argument submitted will produce more than the desired number of results and that the search needs to be narrowed. The client may modify the search to narrow the criteria at location 114. For example, a broad search for "chicken" may be narrowed by adding "sandwich" to the search.

The search returns a number of image descriptions responding to the search criteria. Each of the image descriptions includes (1) a "thumbnail" image 116 of limited size and resolution, an image ID number 118 which uniquely identifies this image as opposed to the others stored in the image database, and (3) a set 120 of keywords which can be used by the client to more quickly access the image in future searches. For each of the retrieved image descriptions, a "see details" link 122 is provided which will transfer the client to a page that gives more details about the image.

The screen 112 once again displays the search icon 76, the browse icon 78, the "cart" icon 80 and the "checkout" icon 82. The search icon 76 permits the client to start a new search and links the client back to search page 92 (FIG. 5). By clicking on the browse icon 78, the client can review the image descriptions that he or she has retrieved. The "cart" icon 80 links to a shopping cart page and permits the client to review the images that he or she has already selected for purchase. The checkout icon 82 links the client to a checkout page to finalize the image order.

Figure 7:
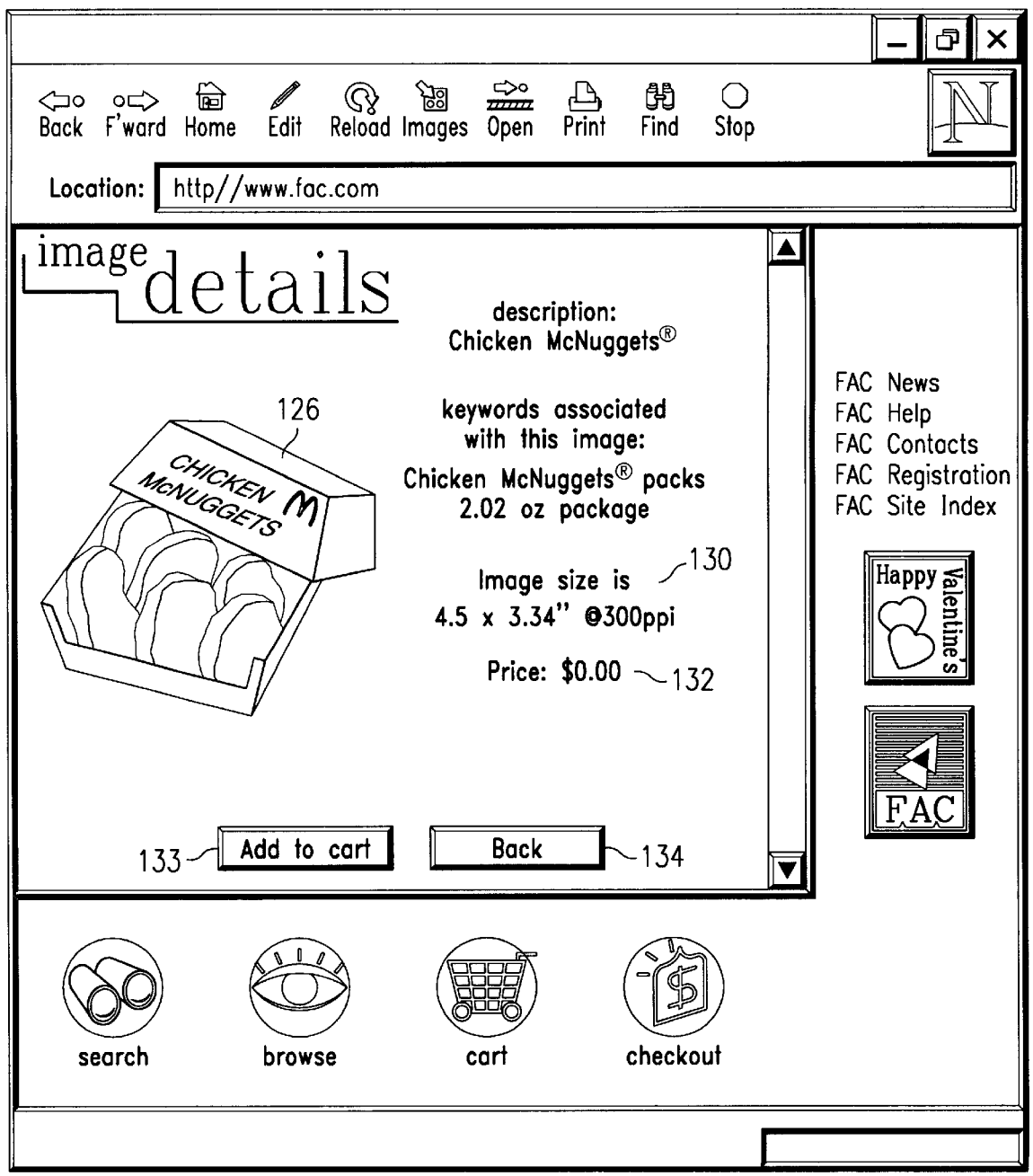

FIG. 7 shows a "details" screen 124 in which a bigger and more detailed image 126 is displayed for the client's review. The client may also ascertain the size of the image as it would appear in, e.g., printed materials at field 130, and the price of the image at field 132. The screen 124 has an "add to cart" icon 133 in case the client decides to purchase the image and a "back" link 134 which returns the client to the search results screen 112 (FIG. 6).

Figure 8:
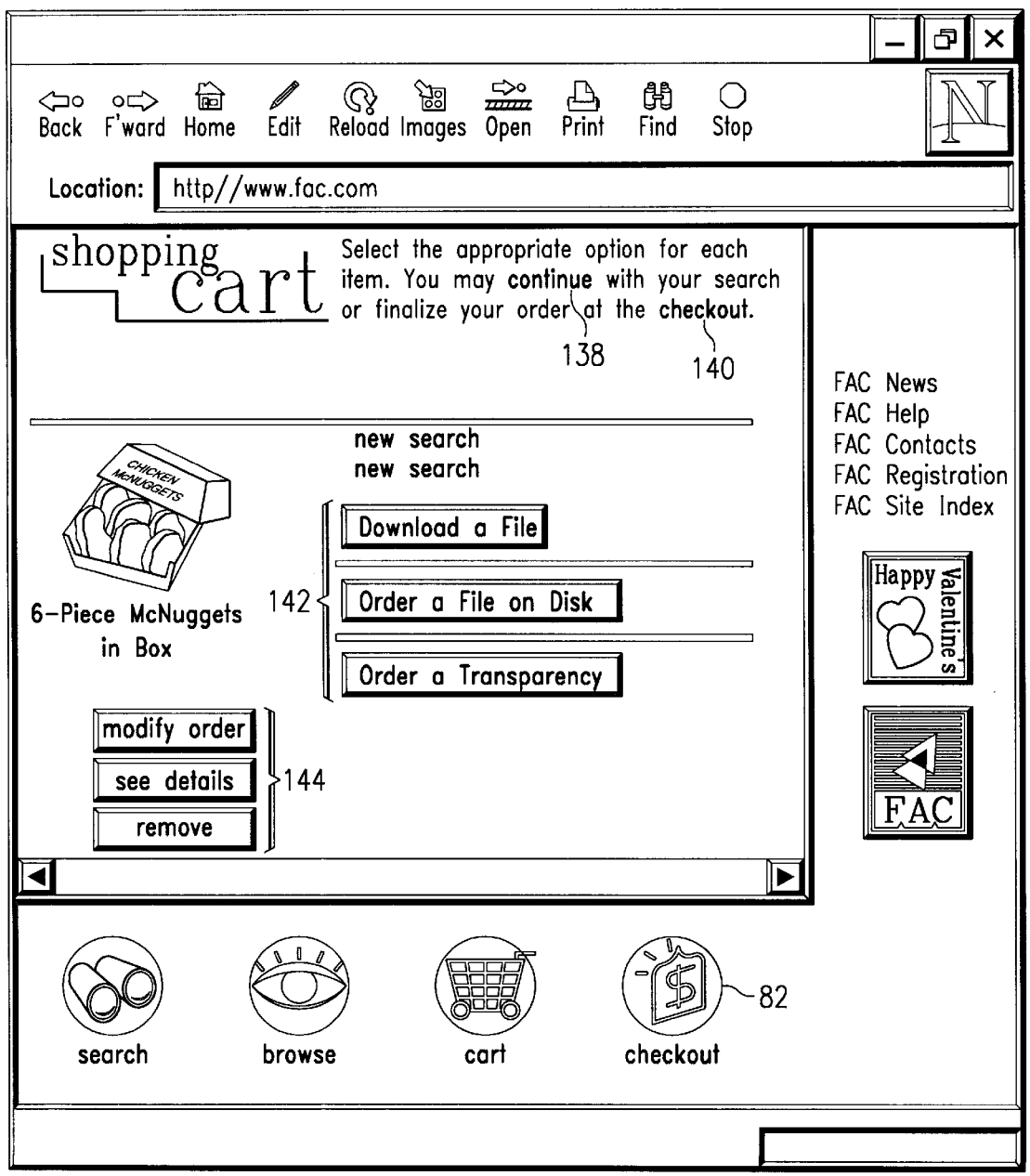

FIG. 8 is a shopping cart screen accessed by icon 80 in, e.g., FIG. 6. The "cart" screen 136 includes a link 138 which sends the client back to the search screen 92 for the retrieval of other images. A "check-out" field 140 may be clicked on, which will link the client to a check-out page.

Figure 9:
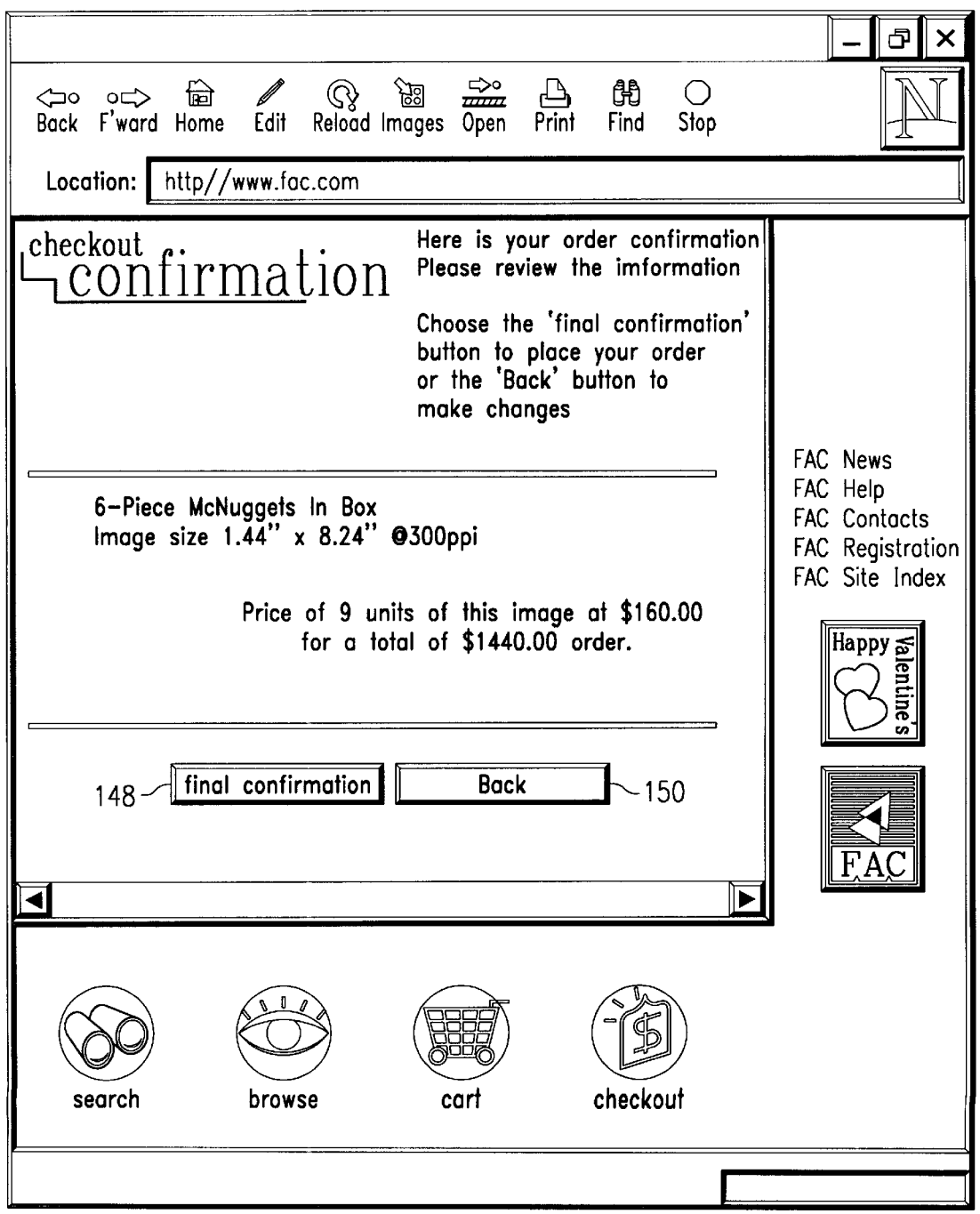

Certain items of information need to be filled in by the client before check out may proceed. The first criterion to be decided by the client is how the image should be received, with downloading, disk and transparencies all being options. This is done at 142. Other information needed for check-out includes the quantity of images desired, which shipping address to use, what specific country the image is for, what type of media the image will be placed in, the color profile, and a file format (Mac or Windows). At location 144 on the screen, the client may click on a "modify order" link to modify any of the above information, remove the item from the cart, or see more details about the item. Pressing on the check-out icon 82 in screen 136 links the client to a confirmation page 146, which is illustrated in FIG. 9. This confirmation page details the image and ordering information which the client has entered. If the information is correct, the client can proceed to order the images. If the information is incorrect and the client wishes to add or subtract from his or her order, this screen presents a last opportunity to do.

The order may be placed by clicking on the "final confirmation" button 148. Clicking on the "back" button 150 permits the client to change the order or to cancel it altogether.

Figure 10:
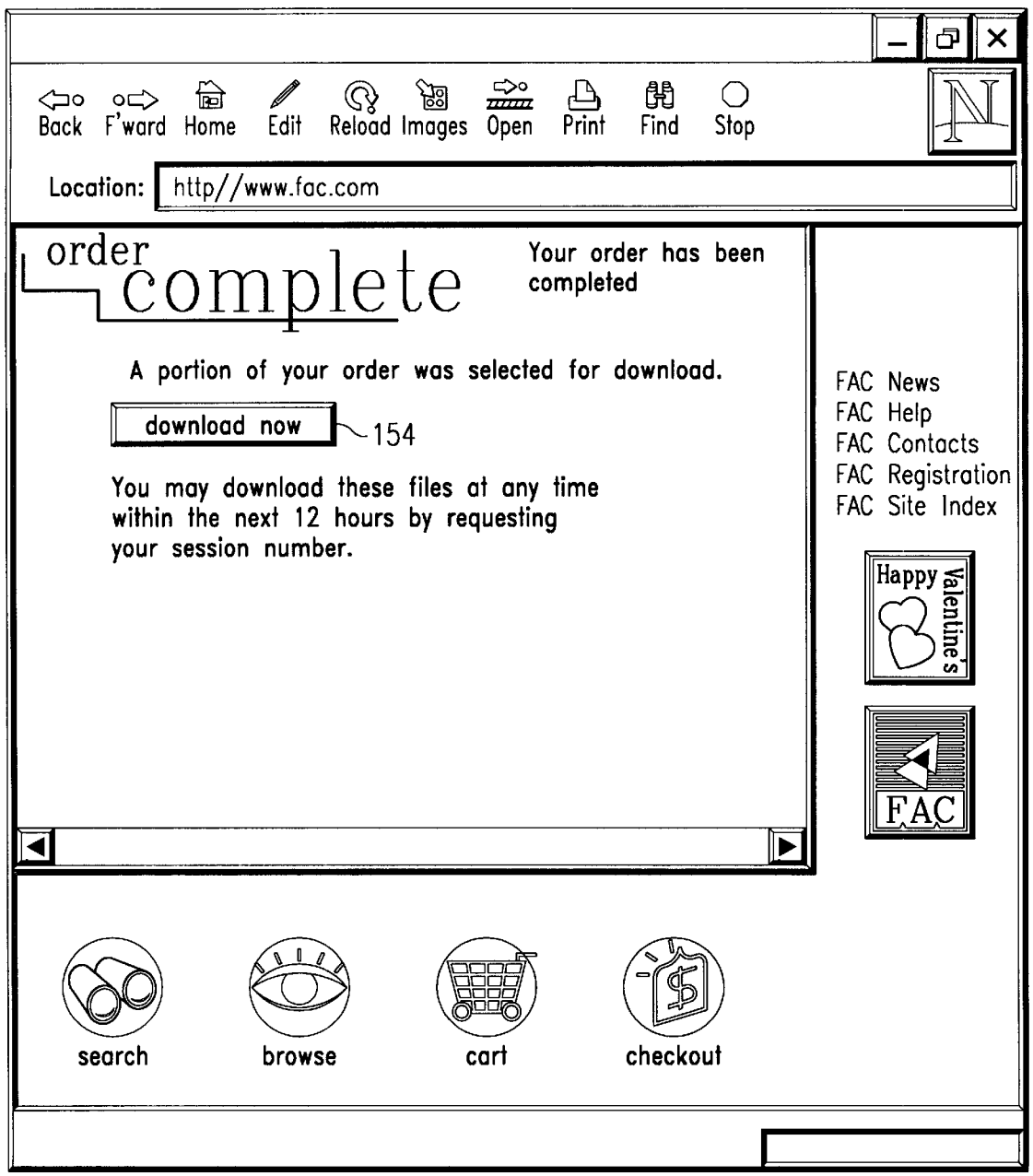

Clicking on the "final confirmation" button 148 links the client to a "complete" screen 152 (FIG. 10). The screen 152 sets forth all of the final details of what the client has ordered; the client may print this page out and keep it. If an image has been ordered by a download method, at this time the client can click on a "download" button 154 to receive the image over the Internet. Once the "complete" screen 152 is reached, an image is available within the next twelve hours for the client to download via file transfer protocol (FTP).

The Image Catalog is the dynamic, digital version of the "decision tree" compiled by the inventors. The contents of the Image Catalog are taken from an Image Database (IDB) which makes the catalog "dynamic." The Image Catalog is the software for interpreting that data and presenting it in a structured and logical way.

The Image Catalog is meant to be a catalog in the true sense: presenting the entire range of choices and options for selecting and configuring a marketing piece. An individual marketing piece is represented as a composite as it is built. A composite contains one client's set of selections and the single resultant marketing piece. The Catalog contains the options of what is available when building a composite.

Every record from the database is represented as an object in the Catalog. The database contains images, text, templates, the objects used to relate these, and other objects.

A content object is one of image, template, or text. A content object is designed to be contained within a slot. Since a template both contains slots and may be contained in a slot, nesting of content is allowed. Note, however, that no template may occur more than once in a shell: circular nesting is not allowed.

Content (images, templates, or text) may be associated with any number of slots. An image, for example, may be valid on a page of both a regular and an Oil-Alliance FSI as well as in a POP Kit.

Since a template without content chosen for its slots is not complete, the most deeply nested template must only have images or text contained in its slots. I.e., the "leaf" content of the tree of objects must be either an image or text. A template is always a branch in a tree and branches always end in one or more "leaves." (For the purposes of the above, a template that has no slots—and hence no dynamic content—is the same as an image and is a "leaf" in a tree.)

Since an image or text object can be associated with any number of slots in any number of templates in any number of page-slots in any number of shells in the Image Catalog, it is the archivist's responsibility to keep track of these associations and be efficient about re-using objects so that, as much as is practicable, only a single representation for a given image asset resides in the database.

One of the objectives in the design of the Image Catalog is to leave as much freedom and control in the hands of the creative teams as possible. It is still the creative team who decides which images should be allowed on which templates and who designs the combinations of images and specifies in what combination they are allowed to be used.

The archivist abstracts this information and encodes it into the Image Database. The archivist encodes the rules that allow the Image Catalog to build its "trees" of associated objects. Thus the archivist is responsible for adding slots to templates and also specifying a slot's search criteria. A slot's search criteria selects for items in the image database (IDB) that the creative team has specified should be made available for the location on a template occupied by that slot. In addition the archivist maintains the keywords associated with objects in the IDB, the "headline copy" for those objects (as approved by the client), information from the original high-resolution database documents needed for on-the-fly composition, and other auxiliary information.

Part of the design of the Image Catalog and hence the data stored in the IDB is to make the final Web Application as data driven as possible without compromising the integrity of the IDB nor biasing its content toward any particular application. The data-driven aspect of the web application makes the addition of new marketing pieces easy: in many cases no new programming is needed at all, the new data are simply entered by the archivist.

Figure 11:
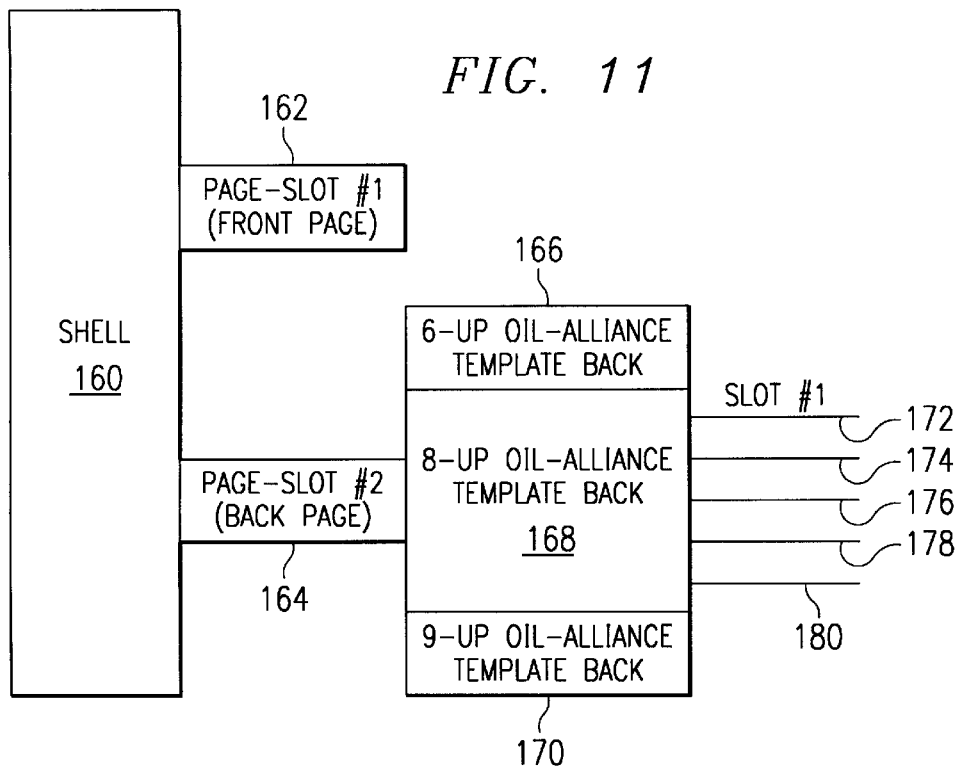
FIG. 11 is a schematic diagram of the internal organization of a representative shell used according to the invention.

FIG. 11 is a diagram of a shell architecture. The architecture shows constraints placed upon the client in the design of marketing pieces. One of the objectives of the invention is to permit clients belonging to a particular organization to be able to design their own marketing pieces, yet do so within constraints imposed by the organization on the type, style, look or feel of the advertising piece. Where there are multiple clients within large umbrella organizations, it is important to protect and enhance the uniform image which the organization projects to the public by setting uniform standards for advertising pieces.

The highest level of organization for the framework of a marketing piece is a shell shown schematically at 160. The shell corresponds to a type of entire marketing piece, such as any of a variety of free standing inserts or a point of purchase display kit. The shell 160 is a logical construct. The shell 160 contains one or more page slots 162, 164. Although a shell per se has no static content, such as images or text, the shell may nonetheless be associated with a thumbnail image in the low resolution database. The thumbnail image (not shown) usually does not represent any actual marketing piece, but rather provides a visual impression of marketing pieces of the type represented by the shell 160.

Page slots 162 and 164 can only contain a "template"; no other type of content is allowed. Each page-slot represents a single page of a shell, and corresponds to a single page of print material for those pieces designed to be printed. A particular page-slot is associated with only one predetermined shell. A simple freestanding insert or "FSI", for example, has two pages, a front and a back. In FIG. 11, a simple FSI shell 160 has a front page slot 162 and a back page slot 164, provided respectively for the front and back sides of a single piece of paper. Page-slots have no location other than page number. Page-slots 162 and 164 are logical constructs that permit for the description of particular pages of multi-page marketing pieces, or single pieces of multi-piece point-of-purchase display kits. Since a page-slot has no dimensions, the template (described below) selected by the client to occupy the page-slot determines the size of the page.

In response to a browse command or other request from a client, the client will be presented with a list of templates that are suitable for placement in the particular page-slot identified by the shell; only certain templates will meet the criteria. In the structure illustrated in FIG. 11, three such templates 166, 168 and 170 are available for the client to select for fitting within the back page page-slot 164. Unlike a shell or a page-slot, a template is not a purely logical construct but rather is associated with a file. A template has two types of content: static and dynamic. The static contents are fixed parts of the template and it may include images and text. For example, the legal copy on a coupon or the main image on a freestanding insert may be "static" content associated with the template. The dynamic content of a template is associated with the template's slots. A template may contain zero to several "slots". From the database's perspective, a template with no slots is essentially an image. Templates are the essential dynamic component of the image catalog. A template is a piece of partially completed artwork that is finished when the client chooses contents for the empty portions of the template, which are the template's slots.

Unlike the shell/page-slot relationship, templates are not associated with page-slots in any fixed way. The page-slot/template association does not rely upon the standard foreign-key mechanism now prevalent in relational design. Instead, the page-slots, and slots generally, have a Search Rule associated with them. The Search Rule is contained in the slot's associated file or in a "usageStyleRights" attribute for the page-slot. The Search Rule is essentially parsed as a qualifier. The advantages of this method include the ability to apply the qualifier in-memory as well as against the image database. Since the qualifiers represent a subset of standard SQL, all qualifiers can be converted into a SQL "where" clause for any relational database; hence, the qualifiers are portable across different database implementations.

In FIG. 11, suppose that the client selects template type 168 for insertion into page-slot 164. The template type 168 has associated with it a plurality of slots 172–180. In general, each one of the slots 172–180 specifies the type of its possible contents. In the disclosed embodiment, the recognized slot types are "image", "text" and "template". For a slot which specifies its content with a content type, only content of that type can be selected by a client in filling the slot. Slots have a fixed location within the template with which they are associated, and a slot is associated with only one template. Slots may not be moved or resized within the template. In one embodiment, the image processor can crop, scale or offset the contents chosen by the client to fit within the slot's bounding geometry. For a text slot, the client may choose, for example, an expiration date for a coupon. For an image slot, the client may choose from one of the available images in the low-resolution database; image and text objects may be associated with any number of different slots. It is even possible to use a slot to contain a further template, permitting nesting of templates.

Two types of text may be inserted into a text slot. The client may select from one of several predefined text options if the slot so directs. Other slots will define user-entered text.

The procedure by which a customer at a remote location can design a marketing piece is illustrated by the flow chart in FIG. 12. At the beginning, at step 190, the user is given the number of shells to choose from, using a shell browser application. When the client selects the shell, the web software is notified as to which shell is being created. Page navigation is initialized at step 192, such that the client can page back and forth between the pages of the shell by the means of buttons placed within the page (not shown). As indicated at step 194, the procedure proceeds serially through each page of the shell.

At step 196, the client is given a list of templates to choose from for the page, using a template browser. When the client selects a page, at step 198 he or she is shown an edit screen for the template as using a template editor. There is a separate backside editor module used for the generation of coupons on the backside of the end marketing piece. In either editor, the client is shown a list of slots at step 200 and the web application gives the appropriate edit control for each of the selected slots.

Editing for each of the slots (step 202) proceeds as follows. Discounting further templates, a slot can have three kinds of content: text at 204, an image at 206, or a coupon at 208. The procedure branches according to which kind of slot the current slot is. If the text slot specifies that its contents be predefined at 210, at 212 the client will select a text string from a plurality of such text strings in a popup list. If the text slot is user defined (214), the client enters the text into a presented text edit field at step 216.

If at 206 the slot is identified to contain an image, then the client is given a button at step 218 to take the client to an image browser page where the "thumbnail" images are presented as possibilities for that slot. At step 220, the client selects from the "thumbnails" which have been authorized to fill the slot. If the slot is identified to contain a coupon at step 208, then the client is given a button to go to a coupon selector screen at step 222. In this screen, the client set the valid dates of the coupon at step 224 and selects from several alternatives a predefined text string at 226 for insertion in the coupon.

At step 228 (FIG. 12b), if there are further slots in the current page then the procedure loops back to step 202 to fill in the next slot. If that page is done, the client is prompt to accept the page at step 230. If this page is not the last one in the marketing piece, control is transferred back to step 194 and the slots for a subsequent page are considered. If at step 234 it is determined that the last page has been reached, the client is taken to a results page at step 236. In the results page, all of the pages which the client has designed, and the choices for the slots within each such page, are again displayed. The client is then given the option to order the shell at step 238, which at this point is a marketing piece having a completed design. If the client wants to make one or more changes to the completed design, control is returned to step 194 at which time the client can edit any of the marketing piece's dynamic content.

Figure 12B:
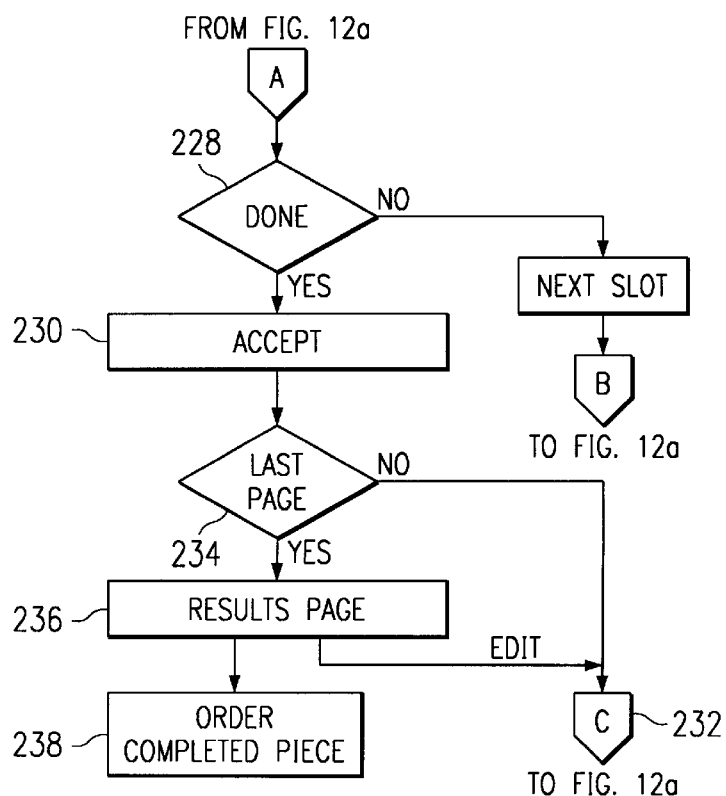
FIGS. 12*a* and 12*b* are a client procedure for assembling a marketing piece from preselected images according to the invention.
Figure 12A:
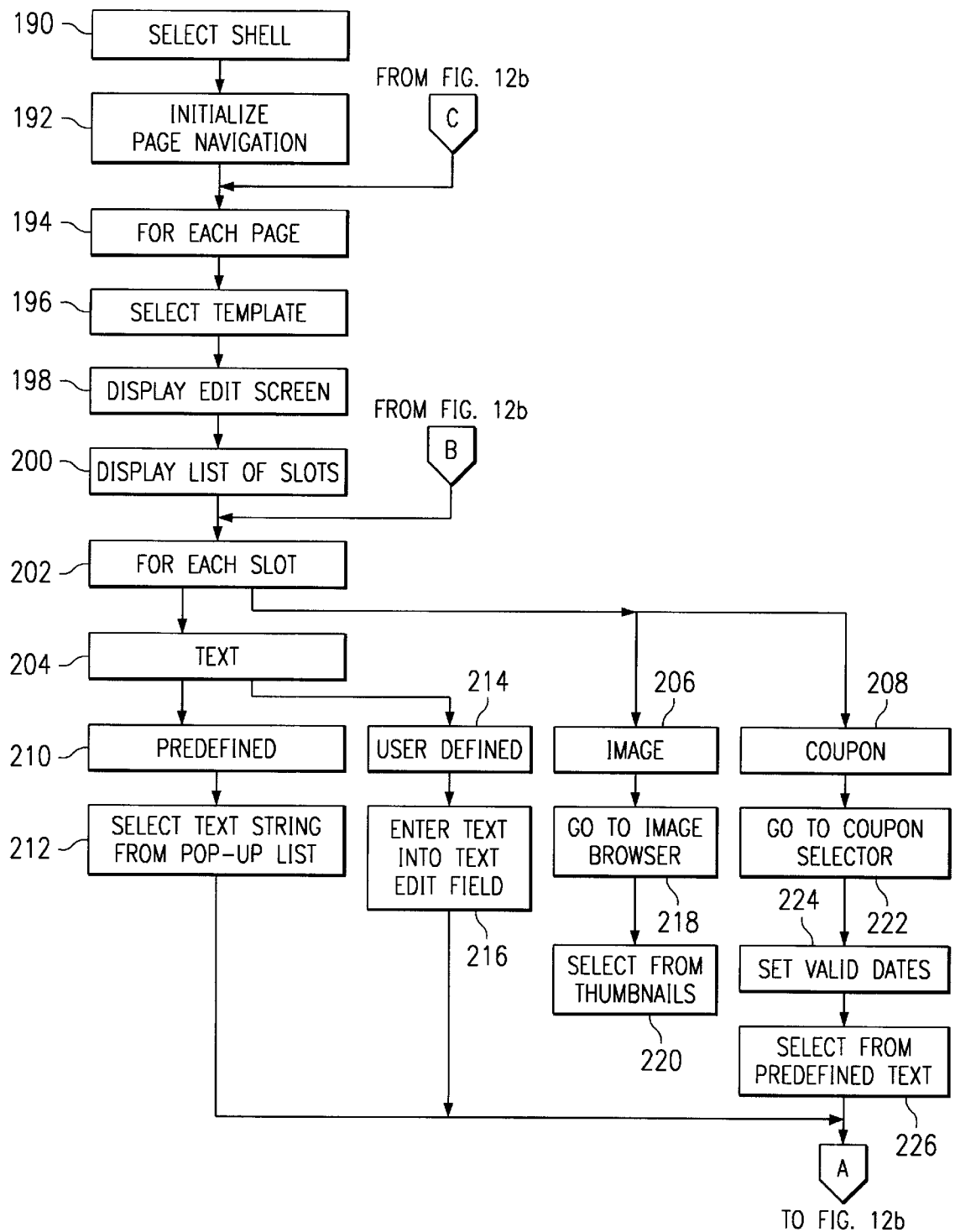

The application described in FIGS. 12a and 12b, and the disclosed embodiment, requires a Block One perl script to call it, and also to order the completed shell once it has been defined by the client. The web logic application, resident on the web site host computer 14 (FIG. 1), will pass an ID number for the generated and completed shell back to the Block One perl script in order for it to be processed. The Block One perl scripts call another application in order to generate a file for the image assembler 20 (Desknet™). The perl script will pass the ID number for the completed shell to this other application.

The table immediately following sets out the architecture of the order record which is transmitted from the web site 14 (FIG. 1) to the image assembler 20. All orders have associated with them the client name, and the name, address, city, state, zip, phone, fax and email of the contact. For free-standing insert (FSI) orders, the information includes shipping name and address, the quantity, cost, print date and distribution date and instructions. For point-of-purchase (POP) display orders, there are fields for the division, region and coOp for which the POP is to be generated, and time frame, order deadline, delivery deadline, shipping information and options, and delivery billing and pricing options. There is also a field for disclaimers to be used. Twenty fields are accorded for additional client/printer required data. After the fields associated with web order date, web order time and template path, there are a large number of fields each associated with a stored image to be retrieved.

| ORDER RECORD | |
|---|---|
| Sequence # | ALL ORDERS |
| Client name | |
| Contact name | |
| Contact address | |
| Contact city | |
| Contact state | |
| Contact zip | |
| Contact phone | |
| Contact fax | |
| Contact email | |
| Shipping name | FSI ORDERS |
| Shipping address | |
| Shipping city | |
| Shipping state | |
| Shipping zip | |
| Quantity | |
| Cost | |
| Print Date | |
| Distribution Date | |
| Distribution Instructions | |
| Division | POP ORDERS |
| Region | |
| CoOp | |
| Time Frame | |
| Order Deadline | |
| Delivery Deadline | |
| Shipping information | |
| Shipping options | |
| Delivery options | |
| Billing options | |
| Pricing options | |
| Disclaimers | |
| Extra01 | ADDITIONAL CLIENT/PRINTER REQUIRED DATA |
| Extra02 | |
| Extra03 | |
| Extra04 | |
| Extra05 | |
| Extra06 | |
| Extra07 | |
| Extra08 | |
| Extra09 | |
| Extra10 | |
| Extra11 | |
| Extra12 | |
| Extra13 | |
| Extra14 | |
| Extra15 | |
| Extra16 | |
| Extra17 | |
| Extra18 | |
| Extra19 | |
| Extra20 | |
| web order date | |
| web order time | |
| template path | STORED IMAGES TO BE RETRIEVED |
| g1p1 | |
| g1p2 | |
| g1p3 | |
| g1p4 | |

-continued

| ORDER RECORD |
|---|
| g1p5 |
| g1t1 |
| g1t2 |
| g1t3 |
| g1t4 |
| g1t5 |
| g1x1 |
| g1x2 |
| g1x3 |
| g1x4 |
| g1x5 |
| g2p1 |
| g2p2 |
| g2p3 |
| g2p4 |
| g2p5 |
| g2t1 |
| g2t2 |
| g2t3 |
| g2t4 |
| g2t5 |
| g2x1 |
| g2x2 |
| g2x3 |
| g2x4 |
| g2x5 |
| g3p1 |
| g3p2 |
| g3p3 |
| g3p4 |
| g3p5 |
| g3t1 |
| g3t2 |
| g3t3 |
| g3t4 |
| g3t5 |
| g3x1 |
| g3x2 |
| g3x3 |
| g3x4 |
| g3x5 |
| g4p1 |
| g4p2 |
| g4p3 |
| g4p4 |
| g4p5 |
| g4t1 |
| g4t2 |
| g4t3 |
| g4t4 |
| g4t5 |
| g4x1 |
| g4x2 |
| g4x3 |
| g4x4 |
| g4x5 |
| g5p1 |
| g5p2 |
| g5p3 |
| g5p4 |
| g5p5 |
| g5t1 |
| g5t2 |
| g5t3 |
| g5t4 |
| g5t5 |
| g5x1 |
| g5x2 |
| g5x3 |
| g5x4 |
| g5x5 |
| g6p1 |
| g6p2 |
| g6p3 |
| g6p4 |
| g6p5 |
| g6t1 |

-continued

ORDER RECORD g6t2
g6t3
g6t4
g6t5
g6x1
g6x2
g6x3
g6x4
g6x5
g7p1
g7p2
g7p3
g7p4
g7p5
g7t1
g7t2
g7t3
g7t4
g7t5
g7x1
g7x2
g7x3
g7x4
g7x5
g8p1
g8p2
g8p3
g8p4
g8p5
g8t1
g8t2
g8t3
g8t4
g8t5
g8x1
g8x2
g8x3
g8x4
g8x5
g9p1
g9p2
g9p3
g9p4
g9p5
g9t1
g9t2
g9t3
g9t4
g9t5
g9x1
g9x2
g9x3
g9x4
g9x5
g10p1
g10p2
g10p3
g10p4
g10p5
g10t1
g10t2
g10t3
g10t4
g10t5
g10x1
g10x2
g10x3
g10x4
g10x5
g11p1
g11p2
g11p3
g11p4
g11p5
g11t1
g11t2
g11t3

-continued

ORDER RECORD g11t4
g11t5
g11x1
g11x2
g11x3
g11x4
g11x5
g12p1
g12p2
g12p3
g12p4
g12p5
g12t1
g12t2
g12t3
g12t4
g12t5
g12x1
g12x2
g12x3
g12x4
g12x5
g13p1
g13p2
g13p3
g13p4
g13p5
g13t1
g13t2
g13t3
g13t4
g13t5
g13x1
g13x2
g13x3
g13x4
g13x5
g14p1
g14p2
g14p3
g14p4
g14p5
g14t1
g14t2
g14t3
g14t4
g14t5
g14x1
g14x2
g14x3
g14x4
g14x5
g15p1
g15p2
g15p3
g15p4
g15p5
g15t1
g15t2
g15t3
g15t4
g15t5
g15x1
g15x2
g15x3
g15x4
g15x5
g16p1
g16p2
g16p3
g16p4
g16p5
g16t1
g16t2
g16t3
g16t4
g16t5

-continued

| ORDER RECORD |
|---|
| g16x1 |
| g16x2 |
| g16x3 |
| g16x4 |
| g16x5 |
| g17p1 |
| g17p2 |
| g17p3 |
| g17p4 |
| g17p5 |
| g17t1 |
| g17t2 |
| g17t3 |
| g17t4 |
| g17t5 |
| g17x1 |
| g17x2 |
| g17x3 |
| g17x4 |
| g17x5 |
| g18p1 |
| g18p2 |
| g18p3 |
| g18p4 |
| g18p5 |
| g18t1 |
| g18t2 |
| g18t3 |
| g18t4 |
| g18t5 |
| g18x1 |
| g18x2 |
| g18x3 |
| g18x4 |
| g18x5 |
| g19p1 |
| g19p2 |
| g19p3 |
| g19p4 |
| g19p5 |
| g19t1 |
| g19t2 |
| g19t3 |
| g19t4 |
| g19t5 |
| g19x1 |
| g19x2 |
| g19x3 |
| g19x4 |
| g19x5 |
| g20p1 |
| g20p2 |
| g20p3 |
| g20p4 |
| g20p5 |
| g20t1 |
| g20t2 |
| g20t3 |
| g20t4 |
| g20t5 |
| g20x1 |
| g20x2 |
| g20x3 |
| g20x4 |
| g20x5 |
| g21p1 |
| g21p2 |
| g21p3 |
| g21p4 |
| g21p5 |
| g21t1 |
| g21t2 |
| g21t3 |
| g21t4 |
| g21t5 |
| g21x1 |
| g21x2 |

-continued

| ORDER RECORD |
|---|
| g21x3 |
| g21x4 |
| g21x5 |
| g22p1 |
| g22p2 |
| g22p3 |
| g22p4 |
| g22p5 |
| g22t1 |
| g22t2 |
| g22t3 |
| g22t4 |
| g22t5 |
| g22x1 |
| g22x2 |
| g22x3 |
| g22x4 |
| g22x5 |
| g23p1 |
| g23p2 |
| g23p3 |
| g23p4 |
| g23p5 |
| g23t1 |
| g23t2 |
| g23t3 |
| g23t4 |
| g23t5 |
| g23x1 |
| g23x2 |
| g23x3 |
| g23x4 |
| g23x5 |
| g24p1 |
| g24p2 |
| g24p3 |
| g24p4 |
| g24p5 |
| g24t1 |
| g24t2 |
| g24t3 |
| g24t4 |
| g24t5 |
| g24x1 |
| g24x2 |
| g24x3 |
| g24x4 |
| g24x5 |
| g25p1 |
| g25p2 |
| g25p3 |
| g25p4 |
| g25p5 |
| g25t1 |
| g25t2 |
| g25t3 |
| g25t4 |
| g25t5 |
| g25x1 |
| g25x2 |
| g25x3 |
| g25x4 |
| g25x5 |

FIG. 13 is a customer profile table containing the address, credit card number, et cetera of the customer soliciting the order. FIG. 14 is a ship-to table identifying the address to which the final marketing piece is to be shipped. FIG. 15 sets out the credit card table associated with the customer, and having fields associated with the particulars of the customer's credit card. FIG. 16 is an address table, having as its fields the address particulars of the customer and organization for which the customer works. FIG. 17 is a group security table having fields associated with group security ID, description and group password. FIG. 18 is a template profile which identifies each template and the images which are available to each frame in the image catalog. The template profile for each template includes its identification, a description, a start date and an expiration date.

FIG. 19 illustrates a template-slots table, in which each template is identified with its respective frame number and the images which are available to each frame. FIG. 20 is a slot image table identifying a particular image held in the image catalog. The image is identified by slot identification, image identification, and type of image. The type of images can be image, coupon, text or template.

FIG. 21 is a customer invoice table setting out customer invoice identity, or ID number, the date that the invoice was created, the time that it was created and the session of the customer which generated the invoice. FIG. 22 is a customer order table which identifies a particular customer order. Fields are provided for invoice identification number, customer identification number, session ID number, order ID number, quantity, cost, order date, delivery date, printed date, date delivered, date order complete, template ID number, and "shipped to" information. The shipped-to address is in turn set up in a table illustrated in FIG. 23, which provides fields for invoice identification number, customer identification number, session identification number, order identification number, and a link to the address table shown in FIG. 16.

FIG. 24 sets out the customer order template identification table, which is used to identify each template and the images which are available to each frame. Information is given for the template identification, slot identification, image identification and image type, and ten fields are accorded for coupon text.

FIG. 25 is a customer extraction table by which orders for images can be fed from the OPI server 30 to the color laser printer 34 (FIG. 1). Fields are given for image names, file paths and box names, as well as similar fields for text. This table also includes fields for quantity, cost, order date, delivery, print date, customized text and template name.

FIG. 26 is an image class table that is used to group images into logical classes. The classes are used to determine which images are shown to which customer. Only one class of images is available to any particular customer identification number. This permits the retention in the image catalog of images designed for different organizations. FIG. 27 is an image class template table which lists the images available under a specific class.

FIG. 28 is a session table that identifies the customer session for which the order was generated, and FIG. 29 is a log in history table. Each of the foregoing tables is an object which may be transmitted back and forth from the web host computer 14 to the image assembler 20 and the OPI server 30.

The Image Catalog describes all of the possible combinations of objects for use by the client in building a composite image.

The page-slots in the image database are associated with a given shell. In the illustrated embodiment, this is accomplished by equating the page slot series with the shell's serial number. Each page-slot is associated with one and only one shell. Within the entire collection of shells, therefore, a single shell is uniquely identified by its serial number.

The image database has an editorial table (not shown) in which every object, whether a shell, template, slot or content, has an editorial row. Each one of the stored objects has a unique identifier in the form of a row record ID. The image database uses this record ID to associate keywords, thumbnail images and other information with the editorial row. The software manager image database assigns a record ID to every object in the database.

As mentioned above, templates are identified by a Search Rule in the page-slot file. An example of the search qualifier or Search Rule for a page-slot that appears in the page-slots associated file appears as follows:

search = "(assetType = 'template') AND (project = 'Block 2 template backs FSI & solomail Oil Alliance')";   (1)

In the above equation, the assetType is identified as "template", and the project is "Block 2 template backs FSI & solomail Oil Alliance". This project is a single free-standing insert for stores associated with gas stations; the identified template particularly concerns the second block on the back of such a free-standing insert. The above Search Rule explicitly limits the available contents for this page-slot to templates. In addition, the Search Rule uses an arbitrary attribute of catalog objects (from their editorial records), namely "project." The Search Rule selected, in this case, three back-page templates illustrated in FIG. 11.

The Search Rule for a page-slot is associated with its "Search" key. This key is in a dictionary or data structure of key-value pairs. The associated file and an attribute called "usageStyleRights" are parsed as property lists and are expected to yield dictionaries; otherwise a warning is produced indicating a formatting error.

In addition to dynamic content information, slots and page-slots may have other, non-content information associated with them by means of their property lists. The actual associated file from which Expression (1) was taken is set forth as follows:

```
name=ps2;
contents =
{
type = template;                                              (2)
source = predefined;
search =    "(assetType = 'template') AND
            (project = 'Block 2 template backs FSI + solomail
            Oil Alliance')";
};
}
```

As can be seen from expression (2), the Search Rule is nested inside the structure that contains information pertaining to the slot's contents. The source is "predefined", which means that the contents for this page-slot come from the image database itself, rather than from the user.

The name of this page-slot is ps2, where "2" is the page-slot's number in the shell.

The page-slot to template association allows for arbitrary associations. The template merely has to match the Search Rule's criteria and since these criteria are arbitrary, a page slot may select for any template in the image database that fits the rule. This means that templates may be associated with an arbitrarily large number of page-slots. Those page-slots can be in the same shell or in different shells. Templates can be reused between different shells if the designer sees fit to do so. For the proprietor, the reuse of a template means only that the one record for the template and its associated graphics needs to exist in the image database.

Slots select their available contents much the way page-slots do. Expression (3) sets out a Search Rule for a particular slot:

```
{name = g1p1;
bounds = ("-0.125\" ","-0.125\" ",3.25\" ", 3.25\" ");
shape = rectangular;
contents = {
type = image;
source = predefined;
search = "keywords.keyword = '8A'";
};
}
```
(3)

The above Search Rule is specified by keyword. Here, only one such keyword is required, "8A". Single quotes are needed since the keyword is a character field. The "keywords.keyword" notation means "traverse the keywords relationship, look at the keyword attribute and the associated object or table and return the records for which there is a keyword exactly equal to the string '8A'. This Search Rule also recites the type as an image and the source as predefined. The above property list further contains information about the slot's location in its template as well as the shape of the slot. This information is used in producing a preview of the client's composite which he or she has designed, and is also used to drive the HTML image maps for clickable "thumbnails".

Since the associated files are files in the Image Catalog, any number of image database records may refer to an associated file. In such a case, the archivist moves slot-specific information to the usageStyleRights field for that slot. This is what has been done in Expression (4), where the bounds information for the slots which use this file is kept in those slot's usageStyleRights field.

```
{
name = g1p1
shape = "rectangular";
contents = {
type = image;
source = predefined;
search = "keywords.keyword = '11A'";
};
}
```
(4)

In the above Expression, there are quotes around "rectangular", indicating that bounds information is kept under a "rectangular" field.

It is also possible to have a Search Rule that uses multiple keywords. One is given in Expression (5):

```
{
...
contents = {
...
search = "keywords.keyword = '14A' AND keywords1.keyword = 'bubble'";
}
}
```
(5)

In the above Expression note that "keywords.keyword" has been differentiated from "keywords1.keyword". This is to specify that these keywords are different. As many different keyword variables can be added to the structure as is required.

Unlike other objects in the catalog, there are many types of images. The archivist differentiates among these using a variable called assetType. The qualifier which determines whether an editorial record maps to an image is as follows:

```
((assetType = 'image') or (assetType = 'lineArt')
or (assetType = like 'OPI*'))
```
(6)

In the above Expression, an image is anything that has an assetType of "image" or of "lineArt" or that begins with the string "OPI". The "like" operator is the same as the SQL "like" operator. The "*" represents arbitrary character strings. When the qualifier is used to fetch data from a database it uses the SQL appropriate for that database server. Images may be associated with any number of different slots.

There are also more than one type of text in the database, all of which are represented by text objects in the image catalog. The qualifier for text is: (assetType like 'text*'). Hence, a text is anything that has an assetType that begins with "text". Text slots can be of two types: file-based and string-based. File based text slots (or boxes) take the text from a file. The file is either .qtt or .txt. String based text slots take the text from a string in the production order generated from the customer.

The system proprietor may use rule-references to link slot contents together. A rule-reference determines how a client's selection of content for one slot may affect what content is available for other slots in a shell. In essence, what the client uses to fill a particular slot in a shell will act as a filter to what the client can select for other slots in the same shell.

In an alternative embodiment, a further database can be used to store client-supplied images. Each piece or editorial record would be associated with a client via either the user name or a customer ID or some other unique identifier as well as by client.

Every catalog object in this shell has associated keywords and may have one associated thumbnail and one viewex image associated with it.

Each entry in the image database has an associated file. For images and templates, this file is the high-resolution image. Since records are created in the image database for all of the objects of the catalog, rather than just image objects, the associated file is used to store information for objects that do not have an associated image. For slots, the associated files are property lists which are parsed by the catalog framework. The property list contains auxiliary slot information including Search Rules, rule references and relatively location of the box which this slot represents. In the case of Quark Xpress Tag Format text, the associate file is a .xtt file.

The finished marketing piece is also called a composite. A template with slots becomes a composite once contents for all of its slots are specified.

Each object in the catalog has a usageStyleRights field. This stores additional information for the object in the form of a property list. The field is mapped to the "long_description" column in the editorial table. For slots and page-slots, the information in this field is combined with that in the slot's associated file. If there is information under the same key in both locations, the information in the usageStyleRights field superseded that in the associated file.

The order and design logic associated with the web site, sometimes known as the "catalog" application, has only read-only rights with respect to the image database. The client logs onto the database server using a user name that is has only access to one database, and within that database has only select rights granted to it. This means that the catalog framework never creates objects that are not represented in the database. Nor does the catalog application ever add objects to the image database. While the catalog framework does do some processing of the data loaded from the database, all of this processing is done either to implement the logic of the catalog, generally by associating available contents with slots, or for presentation purposes.

The serial number is a field in the editorial record that is used in building relationships between objects in the catalog. The serial number is mapped to a "paper_13 clip" column in the editorial table. The serial number of an object is usually its numbering within a series. For templates, this is mostly arbitrary. For slots, the serial number is determined by the order of the slot within the template. The order is determined front-to-back first, then left-to-right, and then finally top-to-bottom.

Other fields in the editorial record include the long_name of the object, the thumbnail, and the viewex. The thumbnail is a low resolution version of an image archived in the database. Where objects are images, text, template and shells, a thumbnail may exist. Thumbnails are held in a "thumbnails" table in the database. There is a one-to-one relationship between editorial rows and thumbnail rows.

A viewex is a medium-resolution version of an image archived in the database; it is similar to a thumbnail. Very small images may not have an associated viewex record, and in such cases, the thumbnail is always used instead.

In summary, a system and method have been disclosed by which a client, at a remote location, can formulate a particular marketing piece, such as a free-standing insert or point-of-purchase display, within constraints imposed by the client's organization. The use of shells in which the client can insert prestored content permits the production of marketing pieces to occur in days instead of weeks. Low-resolution images are transmitted over the Internet for use by the client, while corresponding high-resolution images are used in printing the final material.

Figure 30:
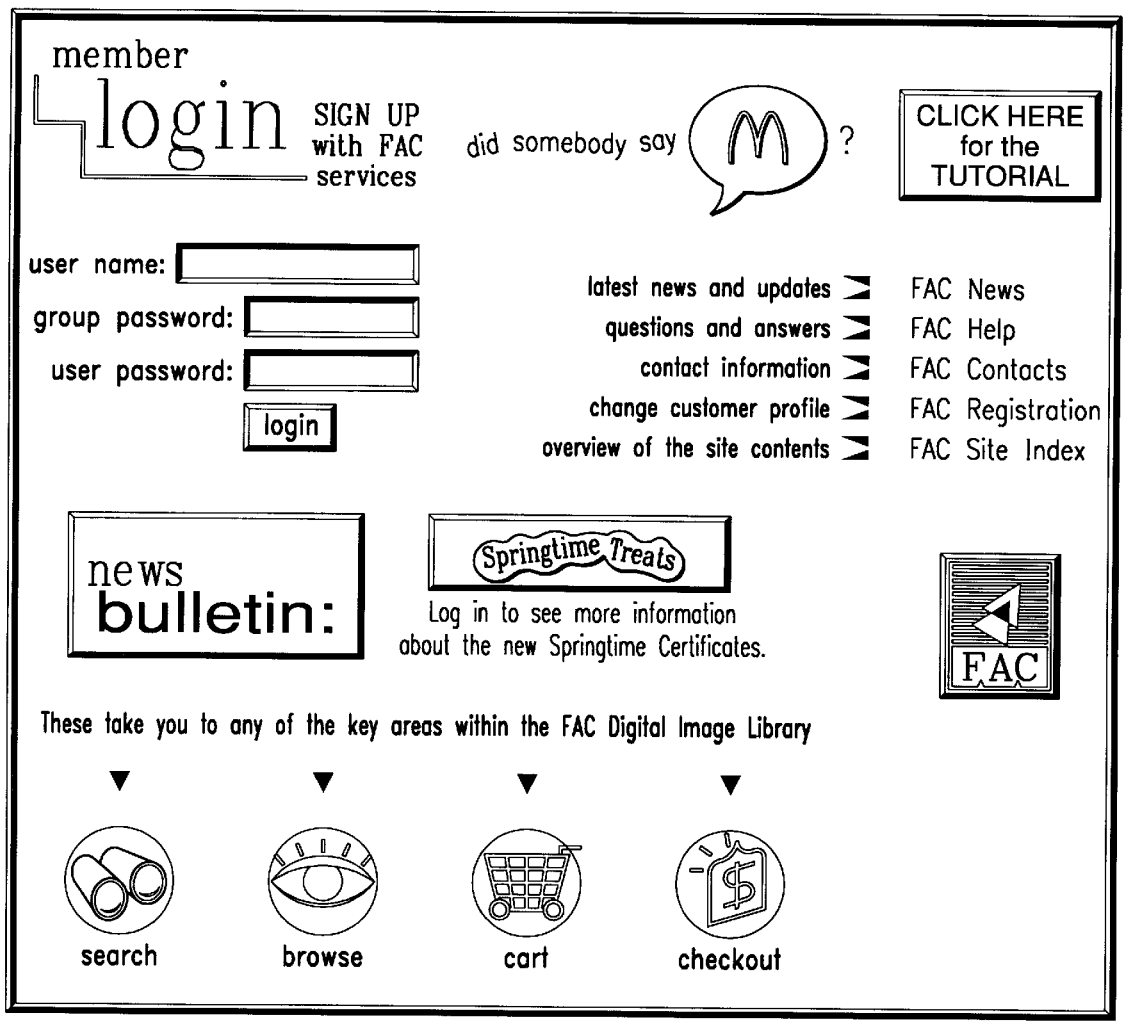
Figure 31:
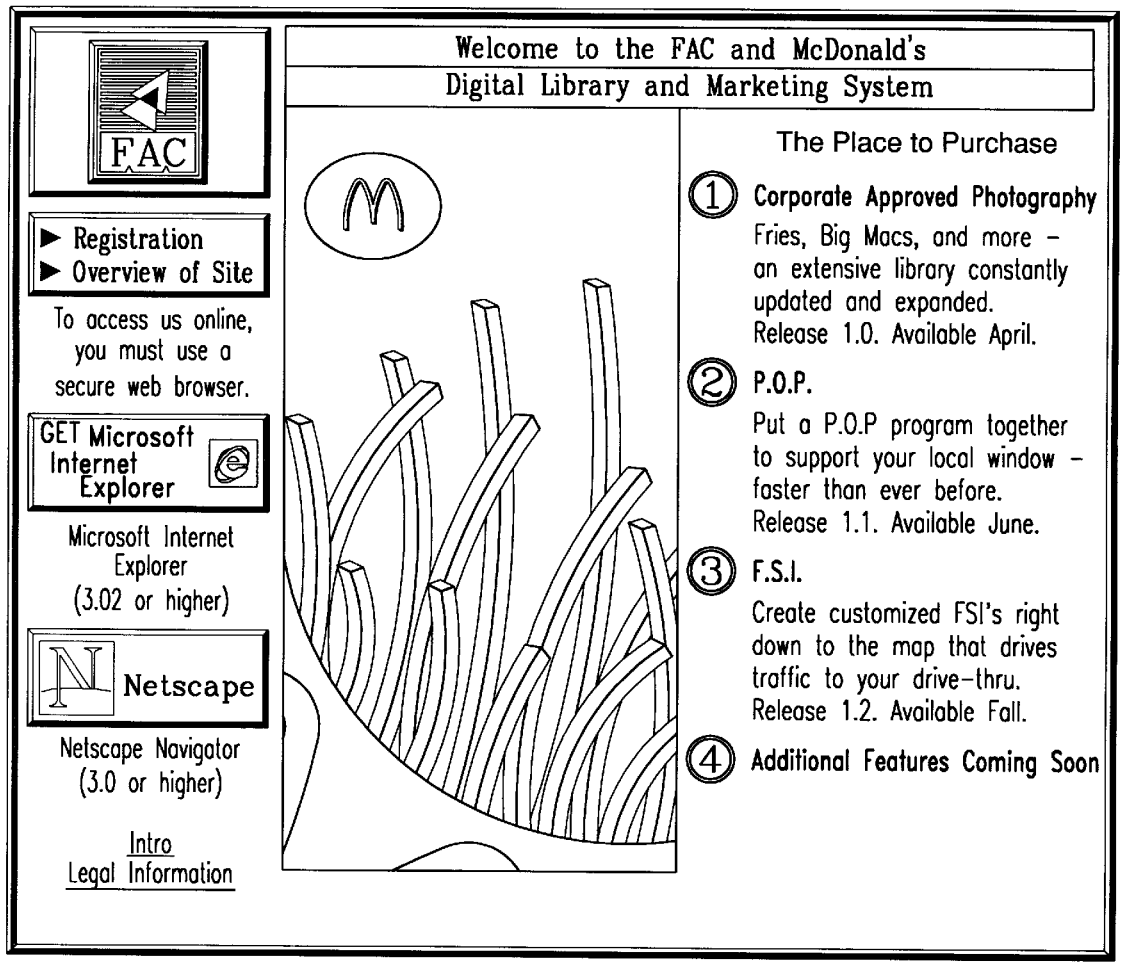

FIGS. 30–38b are successive screens presented to a client in the ordering of images from the image database. FIG. 30 illustrates a log in page. FIG. 31 is a screen which gives an introduction and legal information.

FIG. 32 is a search results page which has retrieved a series of images responding to the word "burgers". Each of the illustrated images relates to a hamburger. Each of the images is further identified with an image number and a description.

Figure 33:
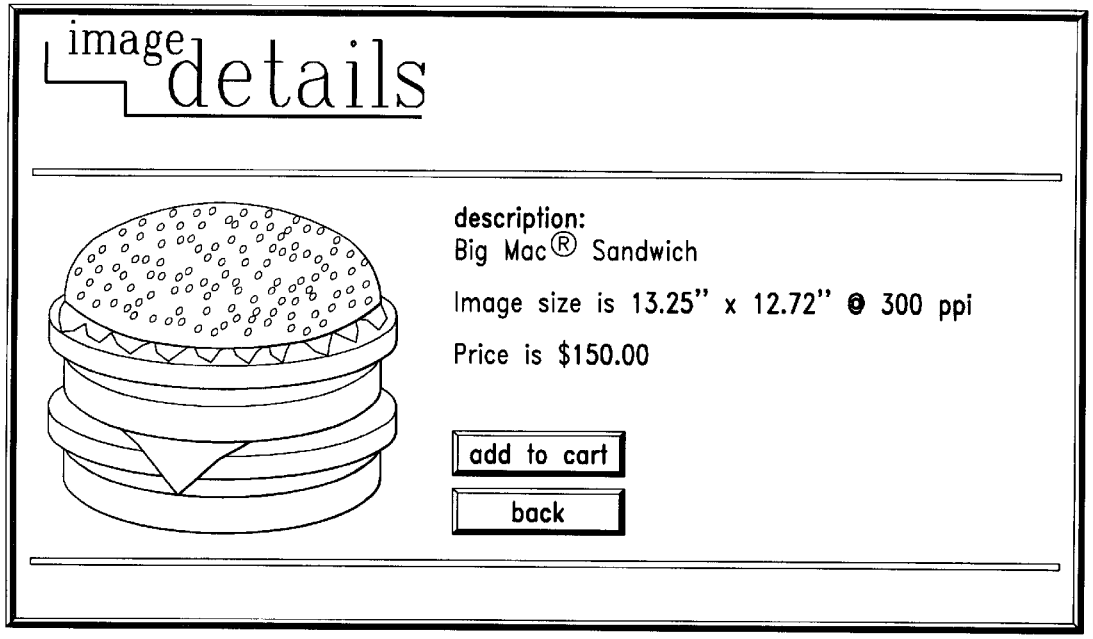

FIG. 33 is a details screen by which further details and a larger image number 0 to 006 has been retrieved. The details screen gives size and price.

Figure 34:
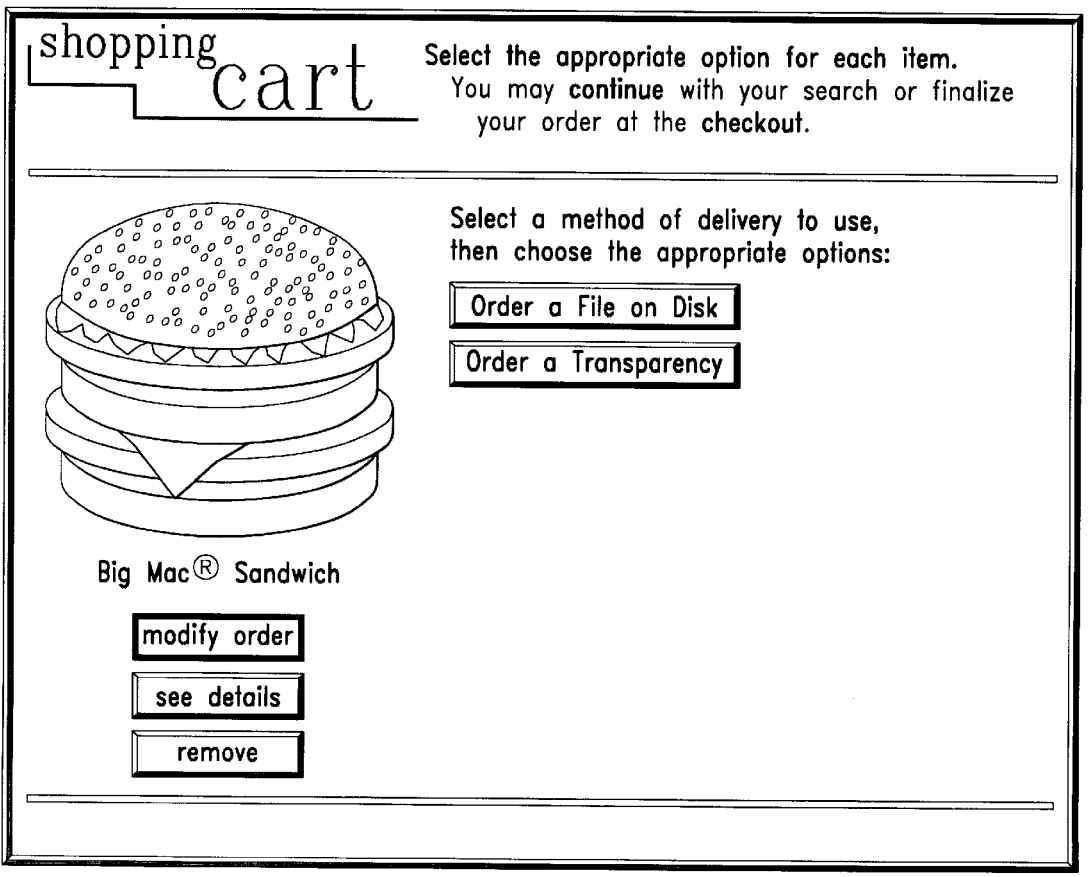
Figure 35:
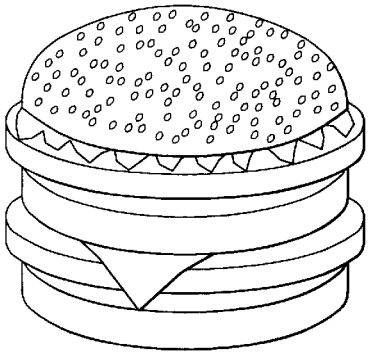

FIG. 34 shows a screen in which the Big Mac Sandwich depicted in FIG. 33 has been added to a shopping cart. In FIG. 35 there is seen the method by which the image is transmitted, shipped or downloaded to the user.

FIG. 36 is a screen in which all of the images that have been purchased have been placed in a shopping cart; this screen may be used by the client to review his or her purchases.

FIGS. 37a and 37b are a screen showing billing information and image charges. FIGS. 38a and 38b illustrate a confirmation screen by which the order is finalized.

FIGS. 39–53 are successive screens encountered by a client in designing a point-of-purchase (POP) mechanizing kit. FIG. 39 is a welcome screen.

FIG. 40 is a beginning screen querying the client as to the region that the client represents. Similarly, FIG. 41 asks for the identity of the cooperative for which the client is placing an order; FIG. 42 asks for the time frame for which the order should be prepared. In FIG. 43, the client is given a choice between two kinds of POP merchandising kits, either a regular menu or a breakfast menu; these will cause separate templates to appear.

Figure 44:
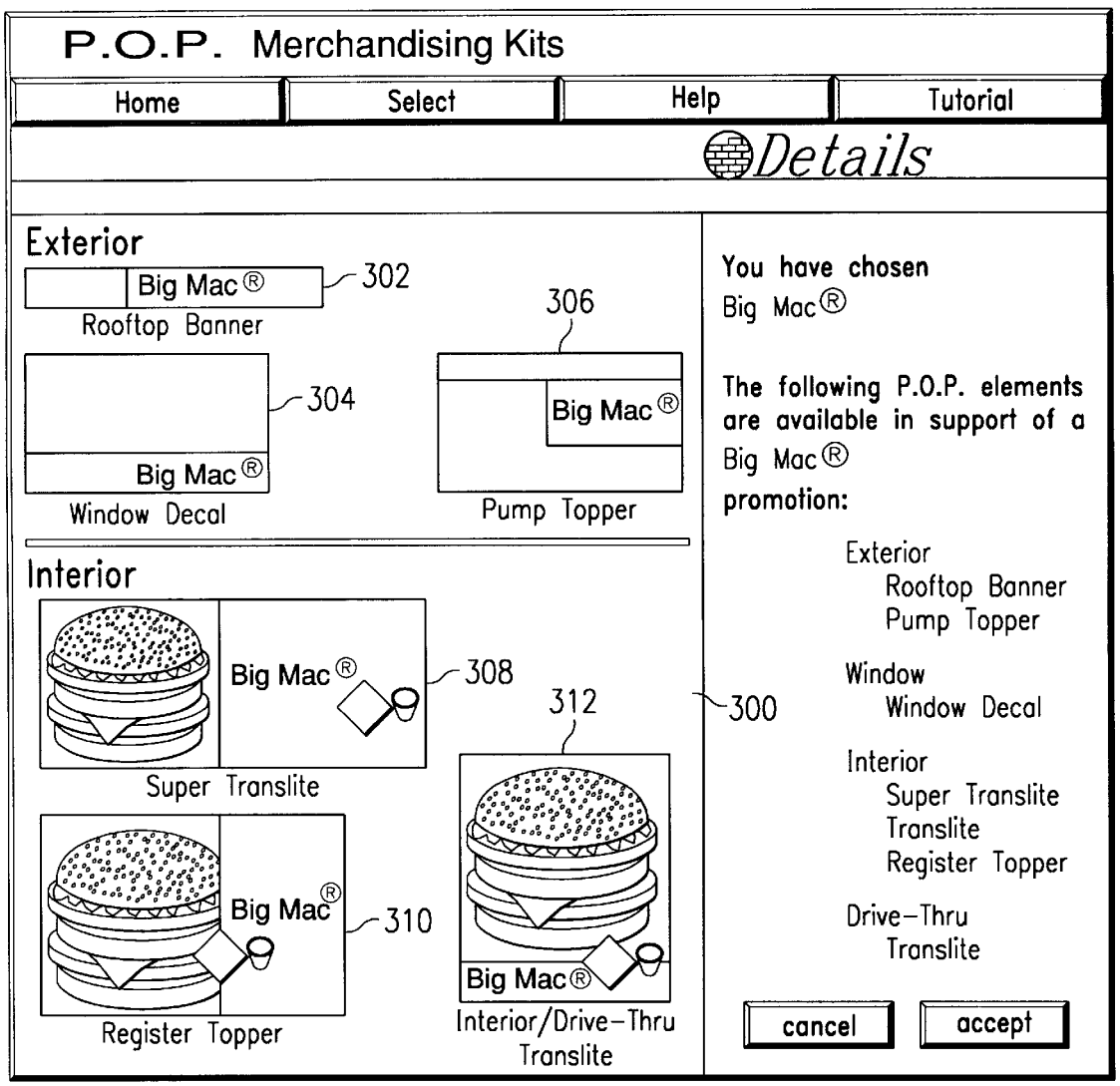

In FIG. 44, one of those templates has appeared, the one for a regular menu. The template indicated generally at 300 has a plurality of page-slots 302, 304 and 306, 308, 310 and 312. While in printed material the "page-slots" each correspond to the front or back side of a printed page, for point-of-purchase merchandising material, each one of the page-slots corresponds with a particular point-of-purchase item that is used as a portion of the kit.

Figure 45:
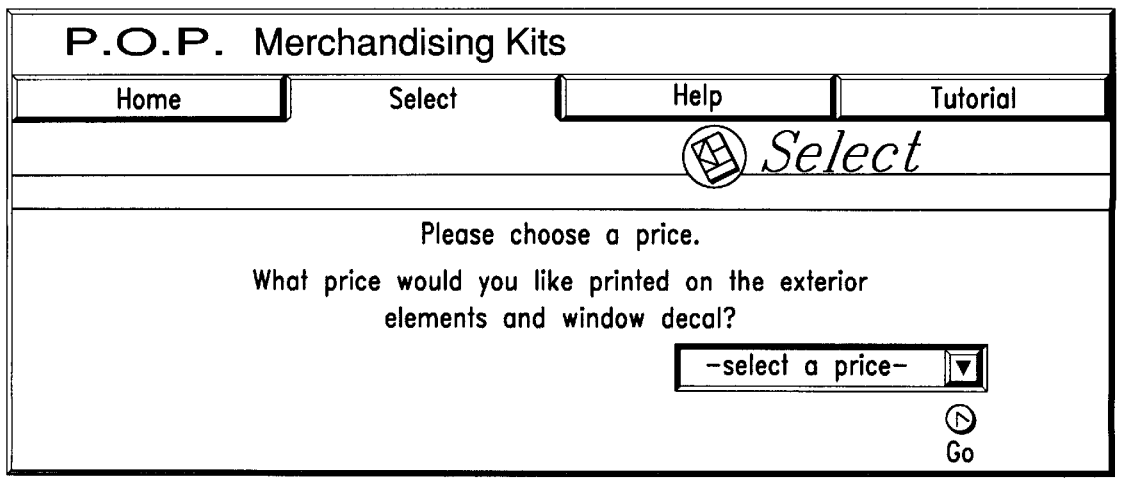
Figures 46, 47:
Figure 48:
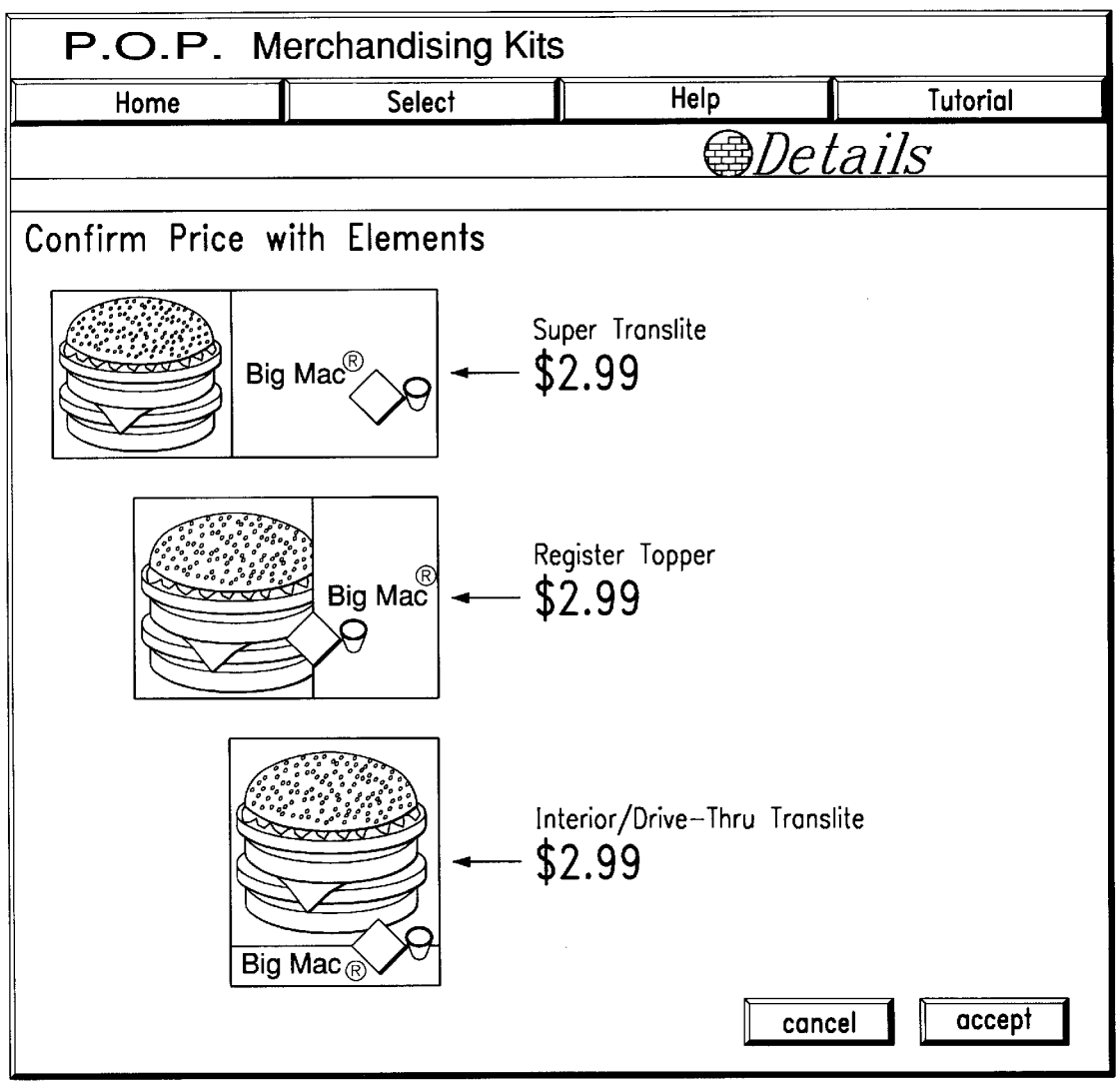

FIG. 45 is the first screen by which the client chooses content for insertion into a slot. In FIG. 45, the program is prompting the client for a price. This text will be inserted on the exterior elements and the window decal (page-slots 302, 304 and 306). FIG. 46 is a screen which confirms the price being illustrated. In FIG. 47, prices are chosen for interior elements 308, 310 and 312. FIG. 48 is a screen which confirms the price that is inserted into slots on these templates. FIG. 49 is an order information page, while FIG. 49a is a billing information page prompting the user to enter billing information.

FIG. 50 is an order information screen prompting the client for address details and special shipping instructions. FIG. 51 is an order confirmation screen that reviews all of the relevant information of the order. FIG. 53 is an order confirmation screen indicating at 316 that the order has been completed.

Figure 54:
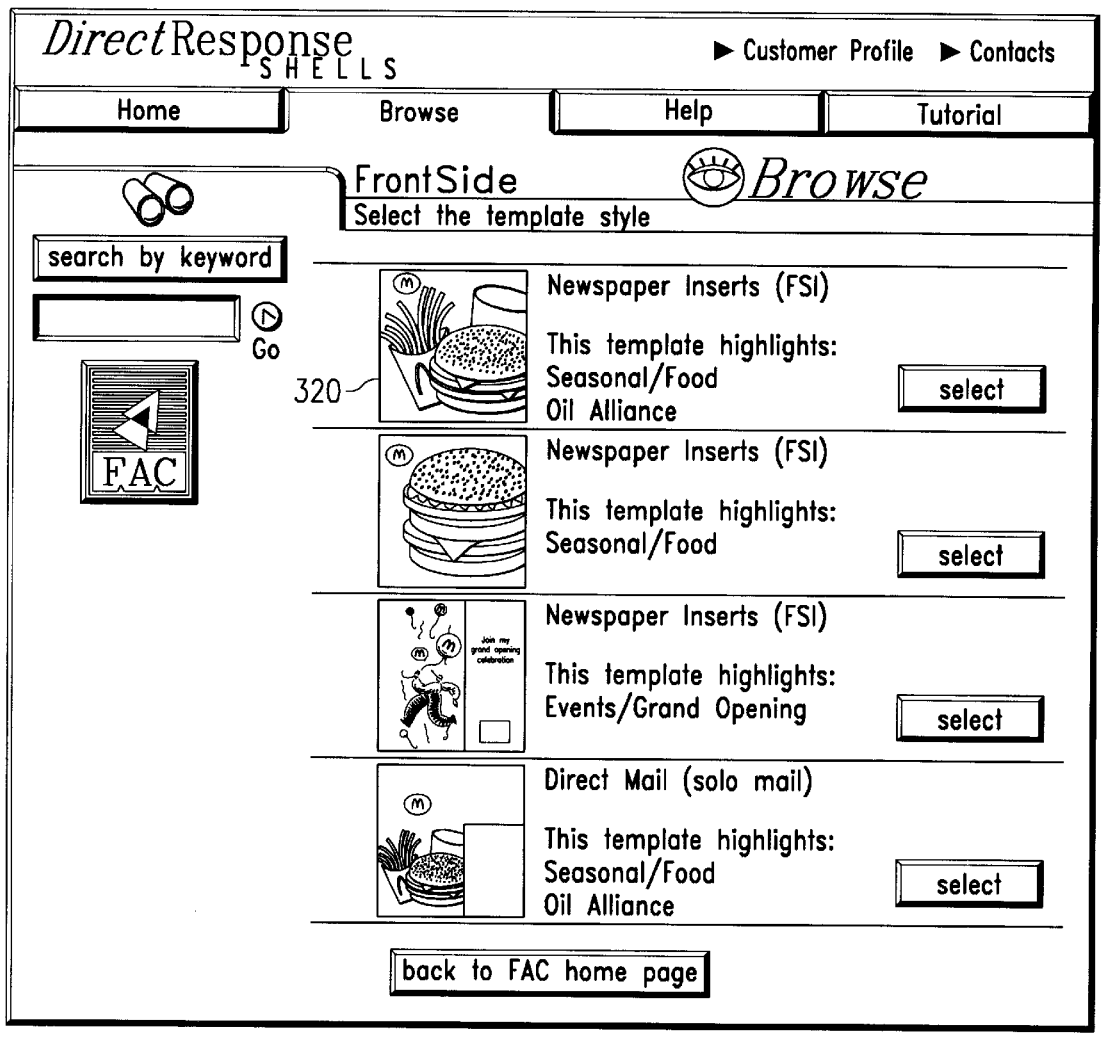
Figure 55:
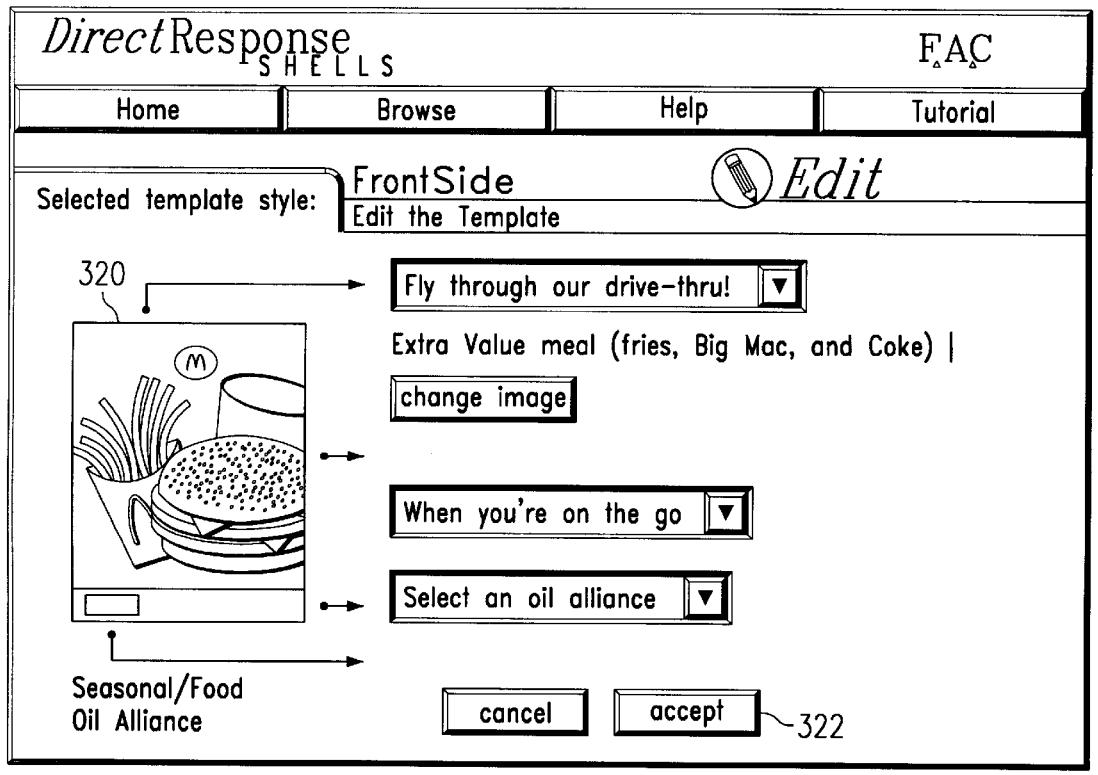

FIGS. 54–62 are a set of screens presented to the client in the design of a free-standing insert or FSI. In FIG. 54, search results have already been returned. In FIG. 54, the client is prompted to select one of the four returned templates for the front side of the piece. In FIG. 55, the first of these templates (template 320) has been selected for completion into a final FSI marketing piece. The client is prompted to select from several predefined text strings to fill in slots on various places on the template. At the end of doing so, the client either cancels this work or accepts at 322.

Figure 56:
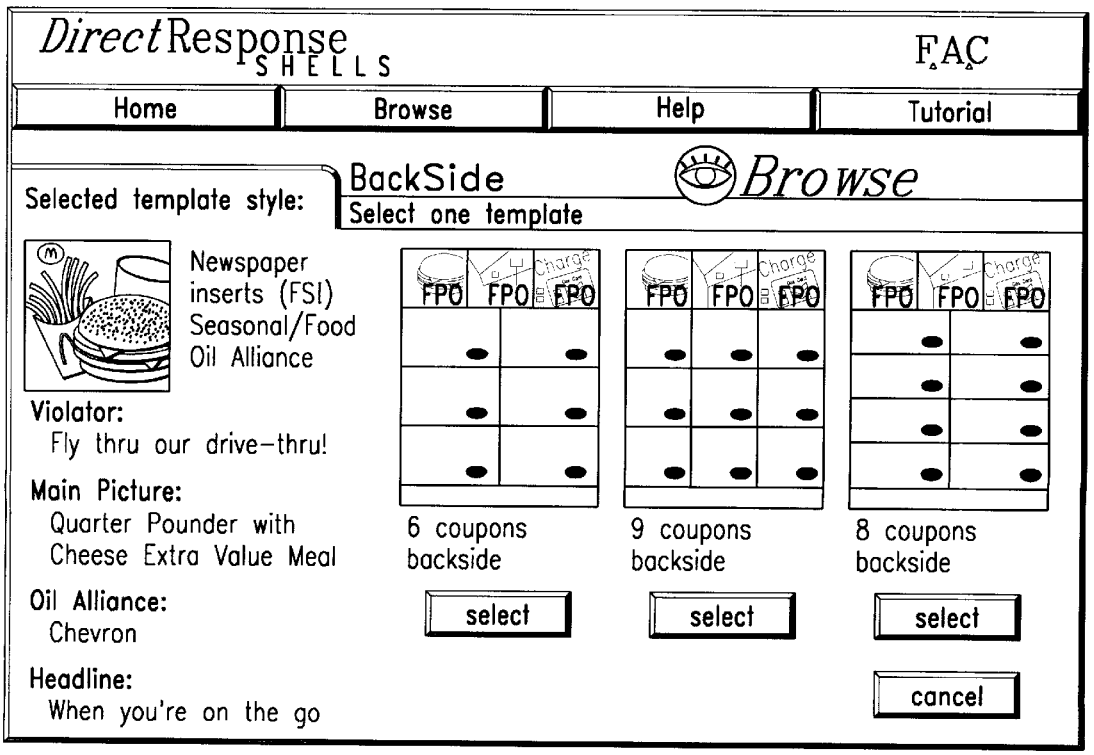

FIG. 56 presents three back sides templates to the client, who is prompted to select one of them. The three templates, respectively, are set up for six coupons, nine coupons, or eight coupons. Each of the template styles now has a front side with a quarter pounder main picture, Chevron as in Allied Gasoline Station, and a preselected headline, "When you are on the go."

Figure 57:

FIG. 57 is a back side editor prompting for different content to be inserted into each of nine areas on the back side of the template. Areas 1, 4 and 7 each include a picture of a food item. Areas 2, 5 and 8 show a map of the store for which the coupon is being offered. Areas 3, 6 and 9 show a store message and image. For each of the coupons, the client fills in a coupon validate and the location where the coupon is valid.

Figure 58:
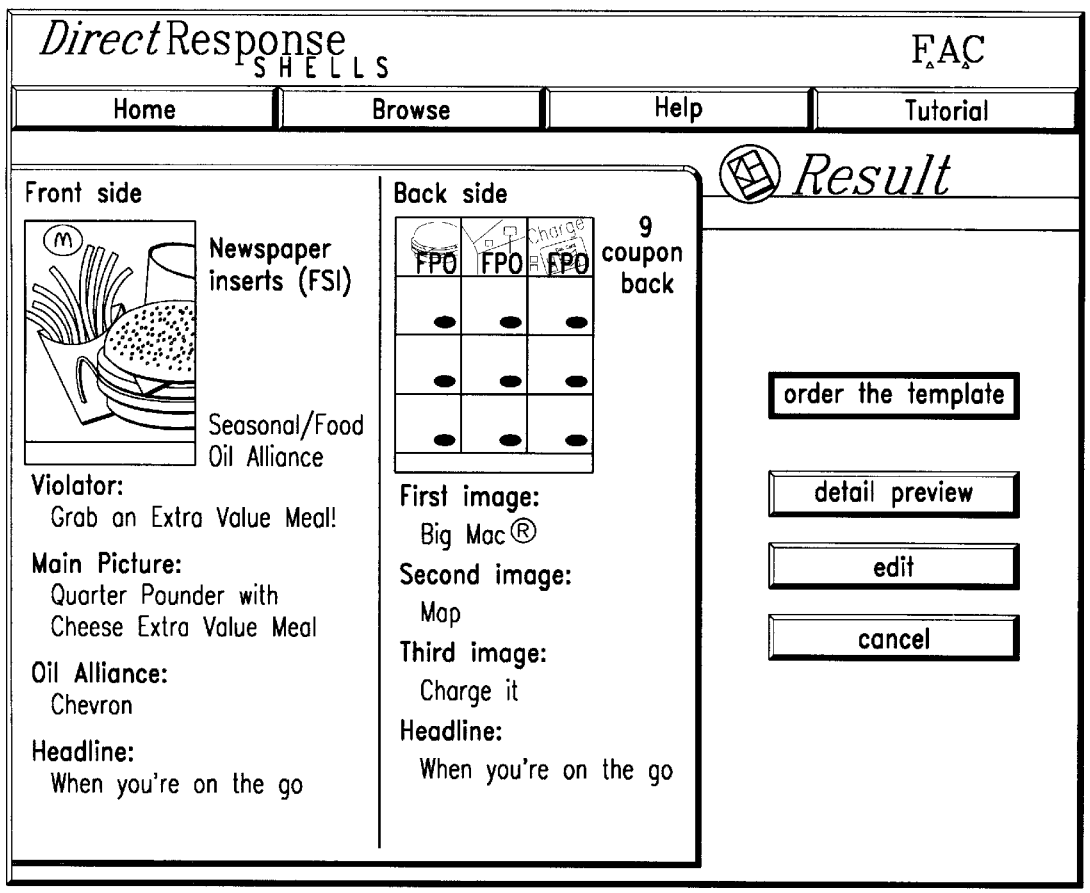

FIG. 58 is a review screen in which the client may review the results of his selections. He can decide to edit these further, cancel or order the template. FIG. 59 is an order information screen by which order information is solicited. FIG. 60 is a billing information screen prompting for the entry of billing information. FIG. 61 is an order confirmation screen recapitulating all of the information solicited from the client, and FIG. 62 is an order completion screen.

While preferred embodiments have been illustrated and described, it should be understood that changes and modifications can be made thereto without departing from the invention in its broader aspects. Various features of the invention are defined in the following claims.

We claim:

1. A method for designing and producing a marketing piece as ordered by a client from a remote location, comprising the steps of:

establishing a web site on a host computer, the client having access to the web site from the remote location;

organizing an object database to have a plurality of objects, each of the objects having an address and a row in a record table, the objects including content objects, shell objects and slot objects, the content objects including image objects, each image object having associated therewith a low-resolution image file and a high-resolution image file;

storing the object database in a memory associated with an image processor;

using search logic associated with the web site and search criteria supplied by the client, searching for one or more images for use in assembling the marketing piece, the search logic returning image search results;

selecting at least one image from the search results for inclusion in the marketing piece;

transmitting a low-resolution image file to the client in response to the step of selecting;

using design logic loaded on the web site, permitting the client to select among a plurality of shells, each of the shells corresponding to a shell object stored in the database, the shells each having at least one slot for the insertion of a content object, said at least one slot corresponding to a slot object stored in the database;

inserting a selected image into said at least one slot;

responsive to the step of inserting, forming a completed marketing piece design;

transmitting parameters of the completed marketing piece design as a marketing piece order to the image processor through the web site;

responsive to the image processor receiving the marketing piece order, creating a marketing piece design using at least one high resolution image file corresponding to the image inserted into said at least one slot; and using the completed marketing piece design to produce one or more copies of the marketing piece.

* * * * *